US012768305B2

(12) United States Patent
Vaidya et al.

(10) Patent No.: US 12,768,305 B2
(45) Date of Patent: *Oct. 20, 2026

(54) TURBINE ENGINE GEARBOX ASSEMBLY

(71) Applicant: General Electric Company, Schenectady, NY (US)

(72) Inventors: Kedar S. Vaidya, Niskayuna, NY (US); Bugra H. Ertas, Niskayuna, NY (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,906

(22) Filed: Dec. 31, 2024

(65) Prior Publication Data

US 2026/0117707 A1 Apr. 30, 2026

Related U.S. Application Data

(63) Continuation-in-part of application No. 17/981,219, filed on Nov. 4, 2022, now Pat. No. 12,276,228.

(30) Foreign Application Priority Data

Jul. 27, 2022 (IN) ............................ 202211043036

(51) Int. Cl.

| | |
|---|---|
| ***F01D 15/12*** | (2006.01) |
| ***F02C 7/36*** | (2006.01) |
| ***F02K 3/06*** | (2006.01) |

(52) U.S. Cl.

CPC .................. *F02C 7/36* (2013.01); *F02K 3/06* (2013.01); *F05D 2260/40311* (2013.01)

(58) Field of Classification Search

CPC .... F02C 7/36; F02C 7/06; F05D 2260/40311; F05D 2240/54; F16H 1/28; F16H 2057/085; F16H 57/082; F16C 2360/23

(Continued)

(56) References Cited

U.S. PATENT DOCUMENTS

| | | | |
|---|---|---|---|
| 8,298,108 | B2 | 10/2012 | Nishida et al. |
| 8,491,435 | B2 | 7/2013 | Ghanime et al. |

(Continued)

OTHER PUBLICATIONS

Ministry of Enterprises and Made in Italy. (Sep. 11, 2024). Search Report For Italian Patent Application No. 202400007375.

*Primary Examiner* — Hung Q Nguyen
*Assistant Examiner* — James J Kim
(74) *Attorney, Agent, or Firm* — Klarquist Sparkman, LLP

(57) ABSTRACT

A gas turbine engine includes a core engine coupled to an input shaft, a fan coupled to an output shaft, and a gearbox assembly. The gearbox assembly includes a split sun gear coupled to the input shaft, a plurality of planet gears intermeshing with the split sun gear, and a ring gear intermeshing with the planet gears. The split sun gear includes a forward sun gear and an aft sun gear each coupled to the input shaft. Each planet gear includes a pin with an outer surface, a rim with an inner surface, and a clearance between the pin's outer surface and the rim's outer surface. The clearance is greater than zero when radial, pinch, tangential, and centrifugal component forces are applied to the planet gear. Each planet gear includes a pin clearance parameter greater than or equal to zero rpm and less than or equal to 3,334 rpm.

20 Claims, 17 Drawing Sheets

(58) Field of Classification Search
USPC ........................................................ 415/122.1
See application file for complete search history.

(56) References Cited

U.S. PATENT DOCUMENTS

| | | | | |
|---|---|---|---|---|
| 10,228,024 | B2 * | 3/2019 | Hallman | F16C 33/581 |
| 10,267,365 | B2 | 4/2019 | Hasting | |
| 10,487,917 | B2 | 11/2019 | Chmylkowski | |
| 10,508,731 | B2 * | 12/2019 | Hallman | F16H 1/28 |
| 10,533,451 | B2 | 1/2020 | Klaus | |
| 10,746,188 | B2 | 8/2020 | MacFarlane et al. | |
| 10,801,609 | B2 * | 10/2020 | Lemoine | B23P 19/04 |
| 10,822,997 | B2 * | 11/2020 | Graham | G01N 29/043 |
| 10,823,084 | B1 * | 11/2020 | Spruce | F02C 7/36 |
| 10,823,260 | B2 * | 11/2020 | Gravina | F16H 57/08 |
| 10,882,629 | B2 | 1/2021 | Hartshorn et al. | |
| 10,954,999 | B2 | 3/2021 | El-Shafei | |
| 11,542,829 | B2 | 1/2023 | Facchini et al. | |
| 12,276,228 | B2 * | 4/2025 | Vaidya | F16H 57/082 |
| 2011/0212808 | A1 | 9/2011 | Pabst | |
| 2019/0113127 | A1 | 4/2019 | Gravina | |
| 2019/0383168 | A1 | 12/2019 | Valva et al. | |

* cited by examiner

| Epicyclic Gear Train 200 | Gear Ratio (GR) | Fan Horsepower (HP) | Fan Speed ($\Omega_{fan}$) (rpm) | Number of Planet Gears 204 ($N_p$) | Planet Gear Bending Stress Neutral Axis Radius 308 ($r_p$) (in.) | Clearance 318 (cr) (mils) | Pin Clearance Parameter (PCP) (rpm) |
|---|---|---|---|---|---|---|---|
| Epicyclic Gear Train #1 | 3 | 8000 | 2933 | 3 | 2 | 3.75 | 87 |
| Epicyclic Gear Train #2 | 3.5 | 30000 | 2629 | 5 | 2.84 | 1.19 | 576 |
| Epicyclic Gear Train #3 | 3.2 | 25000 | 2813 | 4 | 3 | 2.25 | 866 |
| Epicyclic Gear Train #4 | 3 | 29000 | 3333 | 5 | 2.5 | 1.25 | 1291 |

FIG. 17

| Parameter | Range(s) |
| --- | --- |
| Pin Clearance Parameter (PCP) | 0 rpm–3,334 rpm<br>0 rpm–3,000 rpm<br>48 rpm–3,000 rpm<br>48 rpm–1,334 rpm<br>80 rpm–1,300 rpm |
| Gear Ratio (GR) | 3–5 |
| Clearance 318 ($c_r$) | 0.00075" –0.012" |
| Planet Gear Bending Stress Neutral Axis Radius 308 $(r)_p$ | 1.5" –4.0" |
| Number of Planet Gears 204 ($N_p$) | 3–6 |
| Fan Horsepower ($HP_{fan}$) | 7,000 hp–80,000 hp |
| Fan Speed ($\Omega_{fan}$) | 1,600 rpm–3,334 rpm |
| First Constant ($K_1$) | $1.96 \times 10^{5} \frac{1}{hp.min.in}$ |
| Second Constant ($K_2$) | $4.91 \times 10^{-9} \frac{hp.min^3}{in^3}$ |

FIG. 18

TURBINE ENGINE GEARBOX ASSEMBLY

CROSS-REFERENCE TO RELATED APPLICATIONS

This application is a continuation-in-part of U.S. patent application Ser. No. 17/981,219, filed Nov. 4, 2022, which claims the benefit of Indian Patent Application number 202211043036, filed Jul. 27, 2022, each of which is incorporated by reference herein in its entirety.

FIELD

The present disclosure relates generally to a gearbox assembly, for example, for gas turbine engines.

BACKGROUND

Aircraft engines typically include a fan, a low pressure compressor, and a low pressure turbine rotationally coupled in a series configuration by a low pressure shaft. The low pressure shaft is rotationally coupled to the low pressure turbine and a power gear box. The power gear box includes a plurality of gears and is rotationally coupled to the low pressure fan and the low pressure compressor. The gears surround a journal bearing or fluid film bearing. The journal bearing includes a stationary pin surrounded by a fluid film. The fluid film provides lubrication to allow the gear rim to rotate around the stationary pin.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 17 shows exemplary pin clearance parameters for exemplary epicyclic gear trains, according to the present disclosure.

FIG. 18 shows exemplary ranges of values for epicyclic gear train characteristics, according to the present disclosure.

DETAILED DESCRIPTION

Figure 1:
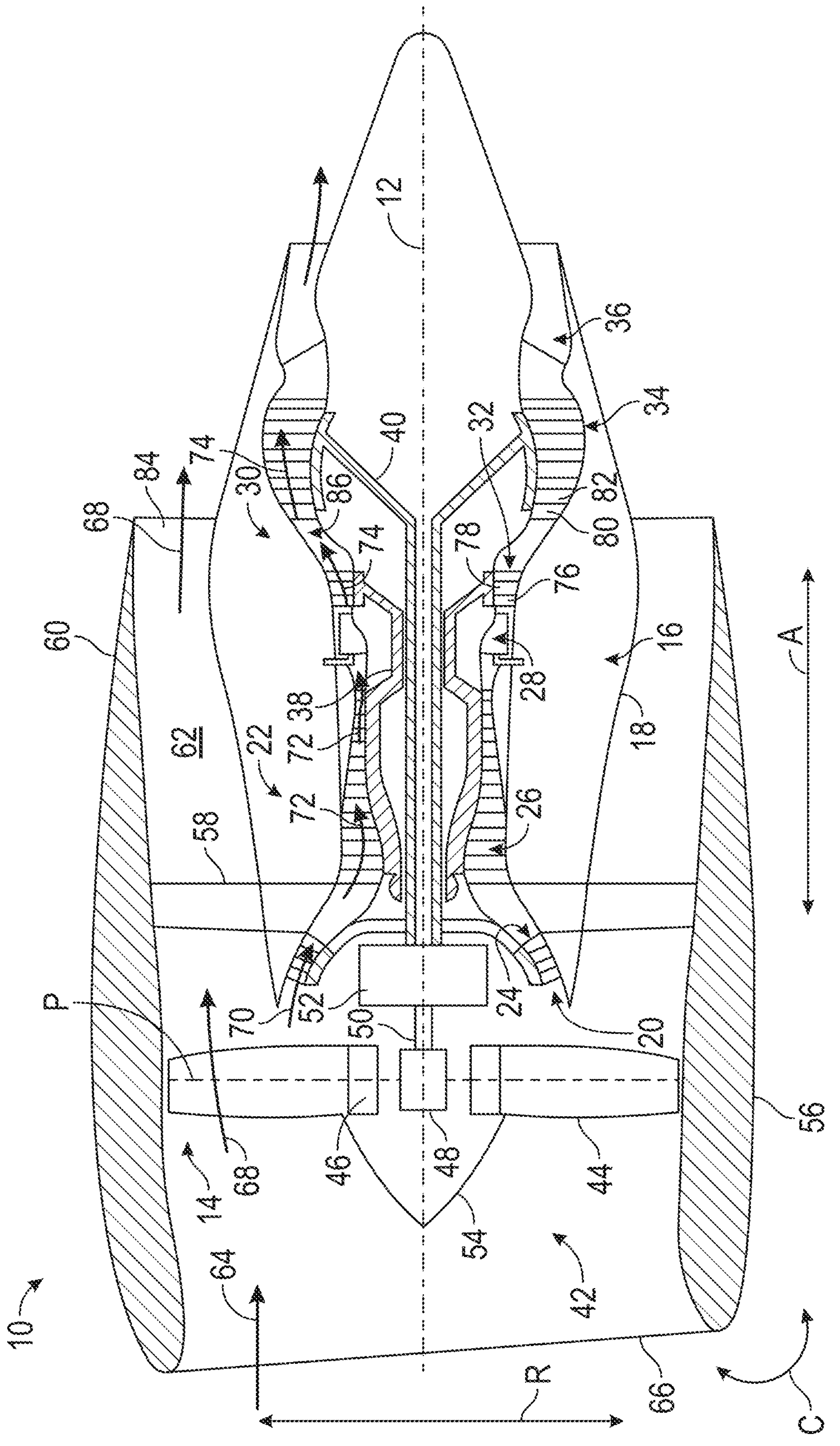
FIG. 1 illustrates a schematic cross-sectional view of a turbine engine, taken along a longitudinal centerline axis of the engine, according to the present disclosure.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Various embodiments of the present disclosure are discussed in detail below. While specific embodiments are discussed, this is done for illustration purposes only. All of the features disclosed in this specification (including any accompanying claims, abstract and drawings), and/or all of the steps of any method or process so disclosed, may be combined in any combination, except combinations where at least some of such features and/or steps are mutually exclusive. A person skilled in the relevant art will recognize that other components and configurations may be used without departing from the present disclosure.

As used herein, the terms "first" and "second," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher," where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., bladed disk rotor blade systems).

The singular forms "a," "an," and "the" include plural references unless the context clearly dictates otherwise. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

The present disclosure provides a gearbox assembly comprising a sun gear, a plurality of planet gears, and an annular ring gear for use in an indirect drive gas turbine engine. The gear train of the gearbox assembly is composed of double helical gears. The double helical gears include two rows of helical teeth that are of opposing helix angles. For example, the sun gear, each of the plurality of planet gears, and the annular ring gear each comprise a double helical gear having gear teeth that mesh with the gear teeth of the adjacent double helical gear, as described in more detail to follow. To achieve assembly of a geartrain having double helical gears, the ring gear may be formed by joining two separate pieces during assembly.

The present disclosure provides a double helical gear with a single piece/unitary ring gear (e.g., not a split ring gear) by providing a split sun gear. The split sun gear in conjunction with the single piece ring gear provides for a small radial envelope for the gearbox assembly (as compared to examples with a split ring gear). The small radial envelope lowers the gearbox weight and provides for a lower profile and thus more performant flow path, which provides for enhanced performance and a lower fuel burn of the turbine engine, as compared to gearboxes with a split ring gear.

In the examples of the present disclosure, the sun gear is a split sun gear such that the sun gear is formed of two separate pieces that are coupled to the input shaft and that may be, in some examples, coupled to each other. The split sun gear may be rotationally coupled to the input shaft with a spline coupling. In some examples, the two separate pieces of the sun gear may be coupled to each other with a curvic coupling. The present disclosure provides for examples of a split sun gear in conjunction with a single piece ring gear. The present disclosure provides for a gearbox assembly that prevents relative axial sliding of the two meshing gears (e.g., by preventing relative axial sliding of the sun gear).

A single piece ring gear allows for a reduced radial envelope by eliminating a bolted connection between two separate pieces of a single piece ring gear. With a single piece ring gear, the sun gear shall then be split into two separate pieces. The combination of a split sun gear and a single piece ring gear allows for a lower radial envelope, easy packaging in the sump, flow path optimization (e.g., due to a low profile gearbox assembly), enhanced efficiency, and a lower weight with a higher reliability, as compared to a gearbox assembly having a split ring gear. A single piece ring gear also allows for a more flexible construction (as compared to a split, bolted ring gear) since there is no limitation to radial deflection that would normally be associated with a split, bolted ring gear. In a split ring gear, radial deflections are controlled and minimized to mitigate risk of fretting at the bolted connection. The more flexible construction, therefore, allows for a more uniform load share among the plurality of planet gears, which, in turn, provides a higher power density of the gearbox assembly.

The present disclosure further provides for double helical planet gears each including a bearing pin comprising a pin outer surface, an annular planet gear rim comprising an inner surface, and a clearance between the planet gear rim's inner surface and the pin's outer surface. The clearance is greater than zero when a radial component force, a pinch component force, a tangential component force, and a centrifugal component force are applied to the planet gear. The clearance is characterized by a pin clearance parameter, defined later herein, that is greater than or equal to zero rpm and less than or equal to 3,334 rpm. The inventors discovered that planet gears with pin clearance parameters within this range beneficially maintain a minimum clearance during takeoff conditions, thereby further enhancing the performance of the gearbox assembly.

Referring now to the drawings, FIG. 1 is a schematic cross-sectional view of a turbine engine 10 (which is also referred to herein as a "gas turbine engine"), taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference), a radial direction R that is normal to the axial direction A, and a circumferential direction C extending about the longitudinal centerline axis 12. In general, the turbine engine 10 includes a fan section 14 and a core engine 16 disposed downstream from the fan section 14.

The core engine 16 includes a compressor section 22, a combustion section 28, and a turbine section 30 arranged sequentially in a serial flow relationship. The core engine 16 is substantially enclosed within an outer casing 18 that is substantially tubular and defines an annular inlet 20. As schematically shown in FIG. 1, the compressor section 22 includes a booster or a low-pressure (LP) compressor 24 followed downstream by a high-pressure (HP) compressor 26, the combustion section 28 is downstream of the compressor section 22, and the turbine section 30 is downstream of the combustion section 28 and includes a high-pressure (HP) turbine 32 followed downstream by a low-pressure (LP) turbine 34. The core engine 16 further includes a core exhaust nozzle section 36 disposed downstream of the turbine section 30, a high-pressure (HP) shaft 38 or a spool, and a low-pressure (LP) shaft 40. The HP shaft 38 drivingly connects the HP turbine 32 to the HP compressor 26 to rotate in unison. The LP shaft 40 drivingly connects the LP turbine 34 to the LP compressor 24 to rotate the LP turbine 34 to the LP compressor 24. Rotation of the LP shaft 40 causes the LP turbine 34 and the LP compressor 24 to rotate in unison.

Referring still to FIG. 1, the fan section 14 includes a fan 42 having a plurality of fan blades 44 coupled to a disk 46 in a spaced apart manner. The fan 42 is illustrated as a variable pitch fan, but some examples of the fan 42 can alternatively be fixed pitch fans. As depicted in FIG. 1, the fan blades 44 extend outwardly from the disk 46 generally along the radial direction R. Each fan blade 44 is rotatable relative to the disk 46 about a pitch axis P by virtue of the fan blades 44 being operatively coupled to an actuation member 48 configured to collectively vary the pitch of the fan blades 44 in unison. The fan blades 44, the disk 46, and the actuation member 48 are together rotatable about the longitudinal centerline axis 12 via a fan shaft 50 that is powered by the LP shaft 40 across a gearbox assembly 52 (which is also referred to herein as a "power gearbox"). The gearbox assembly 52 is shown schematically in FIG. 1. The gearbox assembly 52 includes a plurality of gears for adjusting the rotational speed of the fan shaft 50 and, thus, the fan 42 relative to the LP shaft 40.

Referring still to FIG. 1, the disk 46 is covered by a rotatable fan hub 54 aerodynamically contoured to promote an airflow through the plurality of fan blades 44. In addition, the fan section 14 includes an annular fan casing or a nacelle 56 that circumferentially surrounds the fan 42 and at least a portion of the core engine 16. The nacelle 56 is supported relative to the core engine 16 by a plurality of circumferentially spaced outlet guide vanes 58. Moreover, a downstream section 60 of the nacelle 56 extends over an outer portion of the core engine 16 to define a bypass airflow passage 62 therebetween.

During operation of the turbine engine 10, air 64 enters the turbine engine 10 through an inlet 66 of the nacelle 56 or the fan section 14. As the air 64 passes across the fan blades 44, a first portion of air 68 is directed or routed into the bypass airflow passage 62, and a second portion of air 70 is directed or is routed into the upstream section of the core air flow path, or, more specifically, into the annular inlet 20 of the LP compressor 24. The ratio between the first portion of air 68 and the second portion of air 70 is commonly known as a "bypass ratio." The second portion of air 70 pressurized to generate compressed air 72, and the compressed air 72 is routed through the HP compressor 26 and into the combustion section 28. The combustor of the combustion section 28 is positioned in the core air flow path where the compressed air 72 is mixed with a fuel flow and ignited to generate combustion gases 74. As described in more detail to follow, the fuel flow may be a primary fuel flow provided to the combustor.

The combustion gases 74 are routed into the HP turbine 32 and expanded through the HP turbine 32 where a portion of thermal energy and kinetic energy from the combustion gases 74 is extracted via sequential stages of HP turbine stator vanes 76 that are coupled to the outer casing 18 and HP turbine rotor blades 78 that are coupled to the HP shaft 38, thus, causing the HP shaft 38 to rotate, thereby supporting operation of the HP compressor 26 (self-sustaining cycle). In this way, the combustion gases 74 do work on the HP turbine 32. The combustion gases 74 are then routed into the LP turbine 34 and expanded through the LP turbine 34. Here, a second portion of thermal energy and the kinetic energy is extracted from the combustion gases 74 via sequential stages of LP turbine stator vanes 80 that are coupled to the outer casing 18 and LP turbine rotor blades 82 that are coupled to the LP shaft 40, thus, causing the LP shaft 40 to rotate, thereby supporting operation of the LP compressor 24 (self-sustaining cycle) and rotation of the fan 42 via the gearbox assembly 52. In this way, the combustion gases 74 do work on the LP turbine 34. One or more stages may be used in each of the HP turbine 32 and the LP turbine 34.

The combustion gases 74 are subsequently routed through the jet exhaust nozzle section 36 of the core engine 16 to provide propulsive thrust. Simultaneously, the pressure of the first portion of air 68 is substantially increased as the first portion of air 68 is routed through the bypass airflow passage 62 before being exhausted from a fan nozzle exhaust section 84 of the turbine engine 10, also providing propulsive thrust. The HP turbine 32, the LP turbine 34, and the jet exhaust nozzle section 36 at least partially define a hot gas path 86 for routing the combustion gases 74 through the core engine 16.

Figure 2:
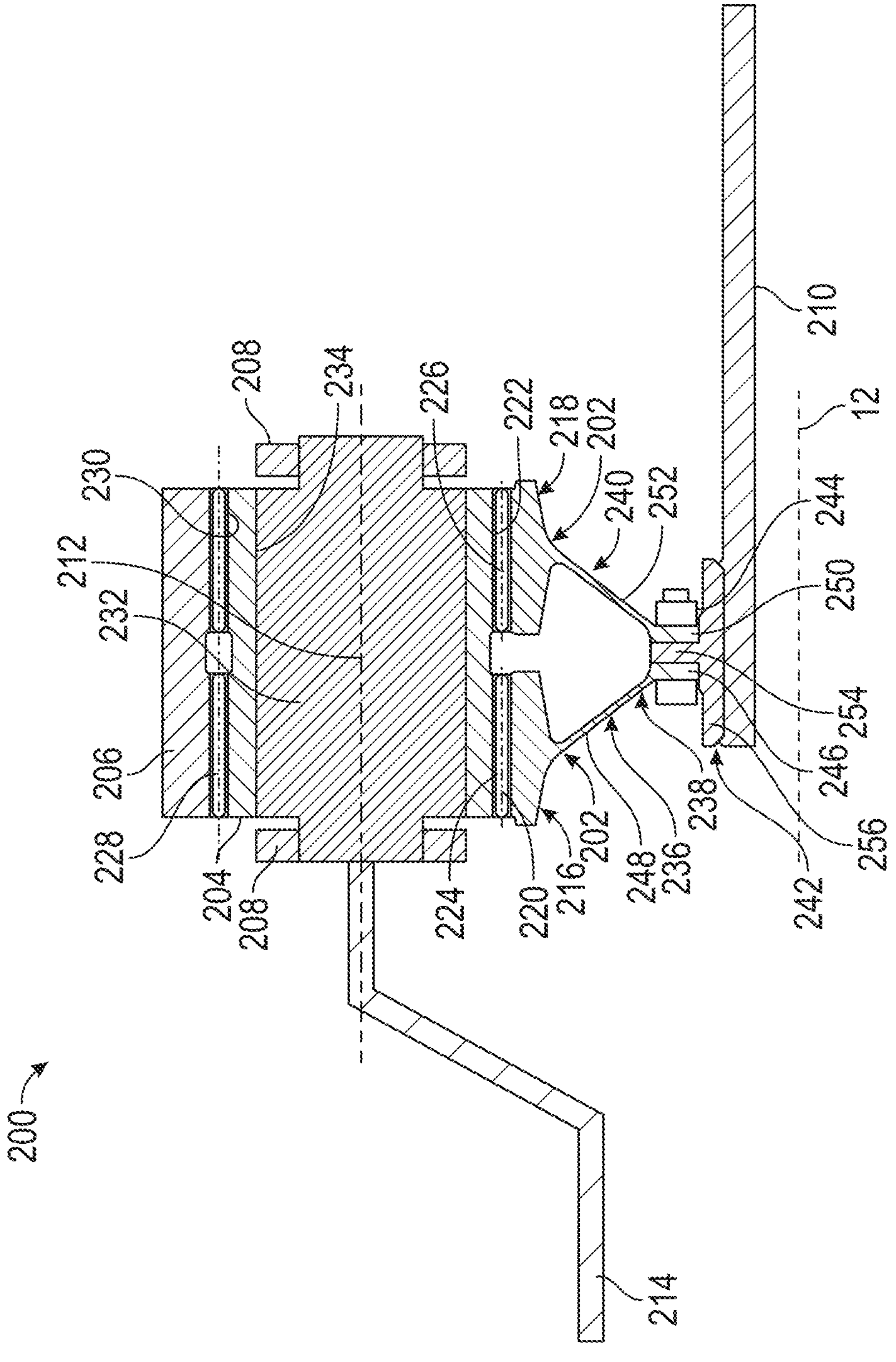
FIG. 2 illustrates a schematic cross-sectional view of a gearbox assembly for a turbine engine, taken along a longitudinal centerline axis of the gearbox assembly, according to the present disclosure.

FIG. 2 is a schematic, cross-sectional side view of a gearbox assembly 200, which may be employed as the gearbox assembly 52 of FIG. 1, according to an embodiment of the present disclosure. The gearbox assembly 200 can include an epicyclic gear train, which in some examples can share certain similar features with other gear trains disclosed herein (for example, the epicyclic gear train 1400 shown in FIG. 14).

The gearbox assembly 200 includes a sun gear 202, a plurality of planet gears 204 (only one of which is visible in FIG. 2), and a ring gear 206. The sun gear 202 is also referred to herein as a split sun gear 202. That is, the sun gear 202 is formed of two separate components (e.g., a forward sun gear 216 and an aft sun gear 218) that have a connection device 236 to couple the two separate components together and to couple the sun gear 202 to the input shaft 210 with the connection device 236. For clarity, only a portion of the gears is shown.

The gearbox assembly 200 is a planetary gearbox assembly. That is, the ring gear 206 is held fixed, with a planet carrier 208 allowed to rotate. In such an arrangement, the fan 42 (FIG. 1) is driven by the planet carrier 208. In this way, the planet carrier 208 is the output of the gearbox assembly 200.

The gearbox assembly 200 includes a gear train including double helical gears. The double helical gears include two rows of helical teeth that are of opposing helix angles. That is, the sun gear 202, each of the plurality of planet gears 204, and the annular ring gear 206 each comprise a double helical gear having gear teeth that mesh with the gear teeth of the adjacent double helical gear, as described in more detail to follow.

An input shaft 210 is coupled to the sun gear 202. The input shaft 210 is coupled to the turbine section 30 (FIG. 1). For example, the input shaft 210 can be coupled to the LP shaft 40 (FIG. 1). The input shaft 210 rotates the sun gear 202. Radially outward of the sun gear 202, and intermeshing therewith, is the plurality of planet gears 204 that are coupled together and supported by the planet carrier 208. The planet carrier 208 supports and constrains the plurality of planet gears 204 such that the plurality of planet gears 204 do not together rotate around the sun gear 202 while enabling each planet gear 204 of the plurality of planet gears 204 to rotate about its own axis 212. Radially outwardly of the plurality of planet gears 204, and intermeshing therewith, is the ring gear 206, which is an annular ring gear. The ring gear 206 is a single piece ring gear. As used herein, “single piece” refers to a single, integral, and unitary component formed of only a single component with no bolted connection in the geared portion of the ring gear, though a bolted connection may be present in a connecting member coupling the ring gear to a static structure, such as the engine frame. The planet carrier 208 is coupled via an output shaft 214 to the fan 42 (FIG. 1) and rotates to drive rotation of the fan 42 about the longitudinal centerline axis 12. For example, the output shaft 214 is coupled to the fan shaft 50 (FIG. 1).

As noted above, the sun gear 202 includes the forward sun gear 216 and the aft sun gear 218. Each of the sun gear 202, the plurality of planet gears 204, and the ring gear 206 comprises teeth about their periphery to intermesh with the other gears. In particular, the forward sun gear 216 of the sun gear 202 comprises a first set of sun gear teeth 220 and the aft sun gear 218 of the sun gear 202 comprises a second set of sun gear teeth 222. As discussed above, the sun gear 202 is a bi-helical or double helical gear such that each of the first set of sun gear teeth 220 and the second set of sun gear teeth 222 are helical teeth angled relative to each other. Each of the plurality of planet gears 204 includes a first set of planet gear teeth 224 and a second set of planet gear teeth 226. As discussed above, each of the planet gears 204 is a bi-helical or double helical gear such that each of the first set of planet gear teeth 224 and the second set of planet gear teeth 226 are helical teeth. The ring gear 206 includes a first set of ring gear teeth 228 and a second set of ring gear teeth 230. As discussed above, the ring gear 206 is a bi-helical or double helical gear such that each of the first set of ring gear teeth 228 and the second set of ring gear teeth 230 are helical teeth.

In the gearbox assembly 200 of FIG. 2, the first set of sun gear teeth 220 of the forward sun gear 216 mesh with the first set of planet gear teeth 224 of each of the planet gears 204 and the second set of sun gear teeth 222 of the aft sun gear 218 mesh with the second set of planet gear teeth 226 of each of the planet gears. Likewise, the first set of planet gear teeth 224 and the second set of planet gear teeth 226 of each of the planet gears 204 meshes with the first set of ring gear teeth 228 and the second set of ring gear teeth 230 of the ring gear 206, respectively.

Each of the planet gears 204 includes a pin 232 about which a respective planet gear 204 rotates. The pin 232 is coupled to the planet carrier 208 and is disposed within a bore 234 of a respective planet gear 204. Lubricant (e.g., oil) is provided between the pin 232 and a respective planet gear 204 such that the planet gear 204 rotates with respect to the pin 232. The pin 232 is illustrated as a single component for simplicity, but may be a sub-assembly that includes one or more of a pin, a journal bearing, and retaining features. For example, similar to the planet gears shown in FIGS. 14-15, the pin 232 can include a journal bearing without any rolling elements.

In some examples, each of the planet gears 204 includes a clearance between an outer surface of the pin 232 and a rim of the planet gear 204. The clearance can be similar to the clearance 1518 illustrated in FIGS. 15-16. In some of these examples, the clearance is in a range from 0.00075 inches to 0.012 inches. The inventors discovered that clearances within this range beneficially result in a planet gear design that further reduces the likelihood of metal-to-metal contact between the pin 232 and the planet gear rim while maintaining a desired lubricant pressure between the pin 232 and the planet gear rim.

In some examples, the clearance is characterized by a pin clearance parameter, which is defined later herein. In some of these examples, the pin clearance parameter is greater than or equal to zero rpm and less than or equal to 3,334 rpm, greater than or equal to zero rpm and less than or equal to 3,000 rpm, greater than or equal to 48 rpm and less than or equal to 3,000 rpm, greater than or equal to 48 rpm and less than or equal to 1,334 rpm, and/or greater than or equal to 80 rpm and less than or equal to 1,300 rpm. The inventors discovered that planet gears with pin clearance parameters within any of these ranges beneficially maintain a minimum clearance during takeoff conditions, thereby improving the performance of the planet gears 204.

As noted above, the connection device 236 couples the split sun gear 202 to the input shaft 210. The connection device 236 includes a forward support member 238, an aft support member 240, an input shaft coupling member 242, and a fastening device 244.

The forward support member 238 includes a first portion 246 and a second portion 248. The first portion 246 extends in the radial direction and includes an opening therethrough (not visible) for receiving the fastening device 244. The second portion 248 extends at an angle between the first portion 246 and the forward sun gear 216.

The aft support member 240 includes a first portion 250 and a second portion 252. The first portion 250 extends in the radial direction and includes an opening therethrough (not visible) for receiving the fastening device 244. The second portion 252 extends at an angle between the first portion 250 and the aft sun gear 218.

The input shaft coupling member 242 includes a first portion 254 and a second portion 256. The first portion 254 extends in the radial direction between and parallel to the first portion 246 of the forward support member 238 and the first portion 250 of the aft support member 240. The first portion 254 includes an opening therethrough (not visible) for receiving the fastening device 244. The second portion 256 extends in an axial direction parallel to the input shaft 210 and parallel to the longitudinal centerline axis 12 (FIG. 1). The second portion 256 is rotationally coupled to the input shaft 210 such that rotation of the input shaft 210 causes rotation of the second portion 256 and, therefore, rotation of the sun gear 202. In the example of FIG. 2, the second portion 256 is rotationally coupled to the input shaft 210 with a spline, such as described in more detail with respect to FIGS. 3A and 3B.

The fastening device 244 extends through respective openings in the first portion 246 of the forward support member 238, the first portion 250 of the aft support member 240, and the first portion 254 of the input shaft coupling member 242. The fastening device 244 is secured within the openings such that the forward support member 238, the aft support member 240, and the input shaft coupling member 242 are fixedly attached together. In this manner, the forward sun gear 216 and the aft sun gear 218 are rotationally coupled to the input shaft 210 by way of the connection device 236. As described herein, the fastening device 244 may be a bolt, screw, weld, anchor, river, or other mechanical fastener.

The illustration of FIG. 2 is a cross-sectional view taken along the longitudinal centerline axis 12 of the turbine engine 10 of FIG. 1, with half of the sun gear 202 omitted for simplicity. The sun gear 202, however, extends circumferentially about the longitudinal centerline axis 12 such that the forward sun gear 216, the aft sun gear 218, the forward support member 238, the aft support member 240, and the input shaft coupling member 242 are each annular member. Accordingly, though a single fastening device 244 is shown and a single opening in each of the first portions 246, 250, and 254 are described, a plurality of fastening devices 244 may be provided in a circumferentially spaced manner about the longitudinal centerline axis 12 to secure the sun gear 202 to the input shaft 210.

Figure 3A:
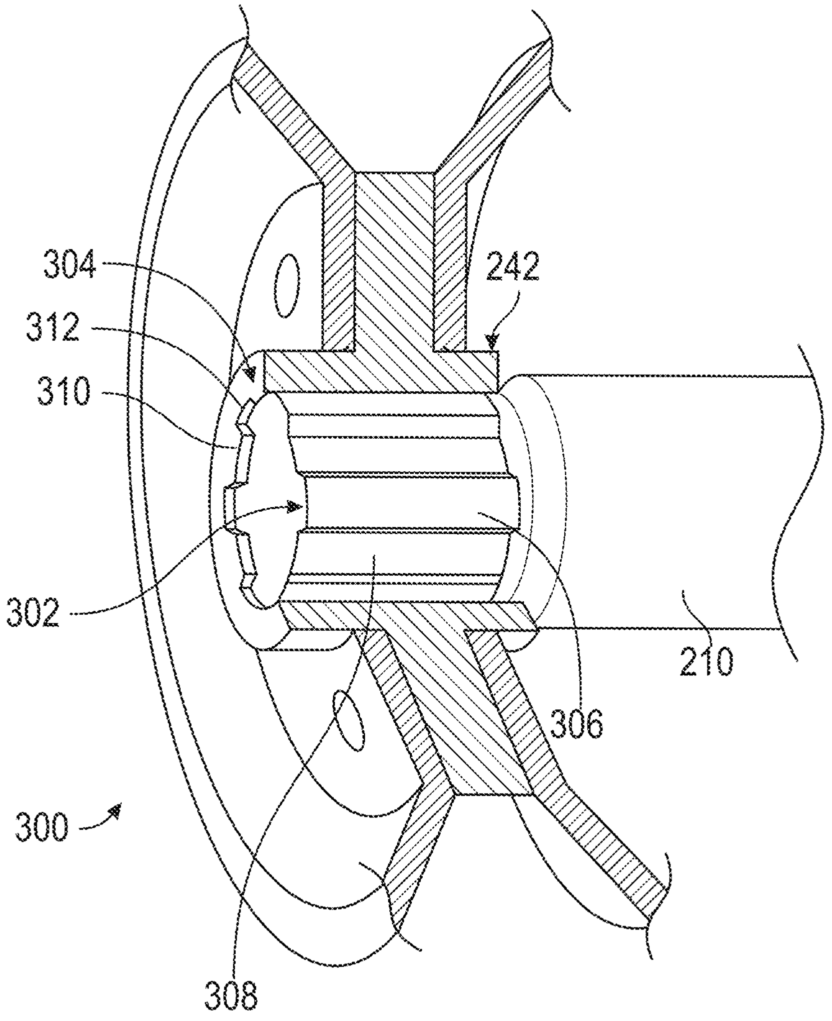
FIG. 3A illustrates a partial cross-sectional schematic view of a working spline connection for a connection device for coupling a sun gear of the gearbox assembly of FIG. 2 to an input shaft, according to the present disclosure.

FIG. 3A illustrates a partial cross-sectional schematic view of an exemplary spline connection 300 that may be employed to couple the input shaft coupling member 242 to the input shaft 210. The spline connection 300 may be a working spline. The spline connection 300 includes a first portion 302 on a radially outer surface of the input shaft 210 that mates with a second portion 304 on a radially inner surface of the input shaft coupling member 242. The first portion 302 includes a plurality of first portion protrusions 306 and a plurality of first portion slots 308 and the second portion 304 includes a plurality of second portion protrusions 310 and a plurality of second portion slots 312. The plurality of first portion protrusions 306 are received within and mate with the plurality of second portion slots 312 and the plurality of second portion protrusions 310 are received within and mate with the plurality of first portion slots 308. In this manner, the input shaft coupling member 242 (and thus the connection device 236 and the sun gear 202) may axially move with respect to the input shaft 210 while remaining rotationally coupled thereto. Although a plurality of slots and protrusions are depicted, more or fewer than shown may be provided. In one example, a single protrusion on one of the input shaft 210 or the input shaft coupling member 242 may be provided and a single slot in the other of the input shaft 210 or the input shaft coupling member 242 may be provided. The spline connection 300 is not limited to the particular structure, shape, and dimensions illustrated in FIG. 3A and other structure, shape, and dimensions are contemplated that allow for rotational coupling between the input shaft 210 and the sun gear 202.

Figure 3B:
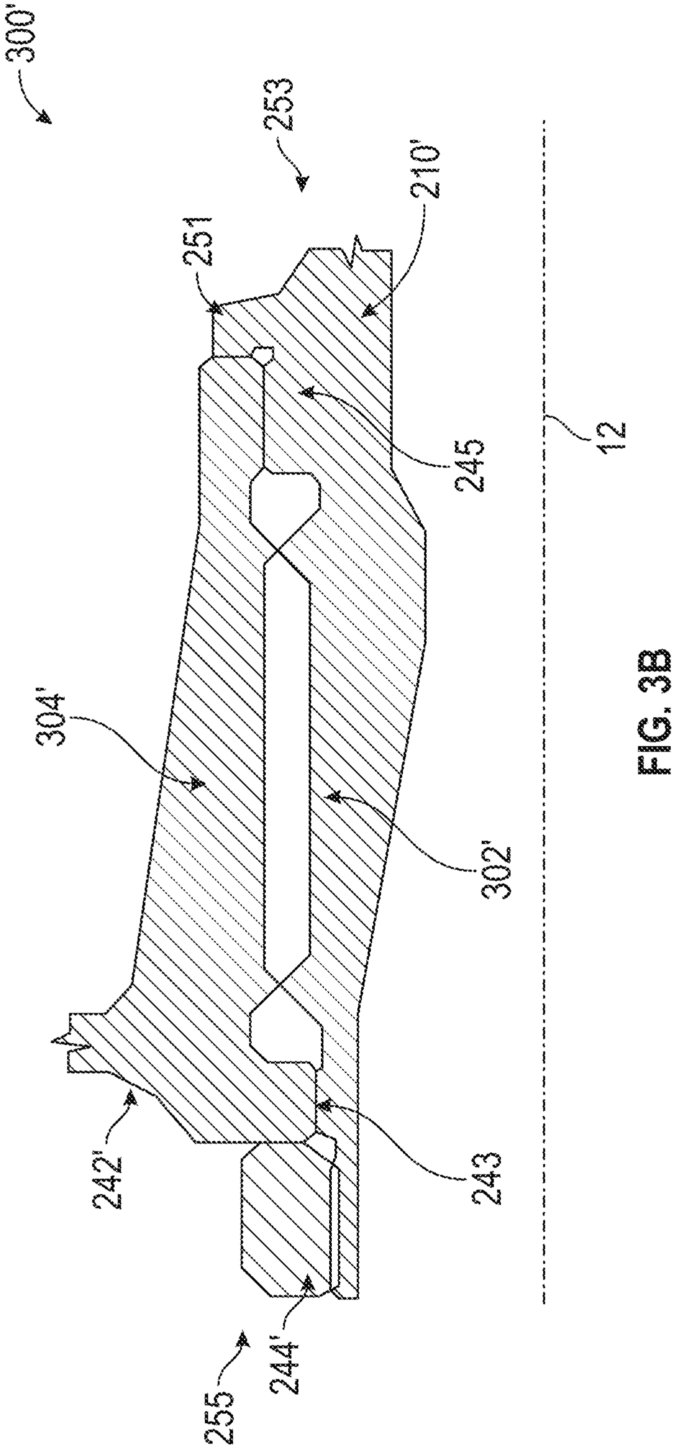
FIG. 3B illustrates a partial cross-sectional schematic view of a fixed spline connection for a connection device for coupling a sun gear of the gearbox assembly of FIG. 2 to an input shaft, according to the present disclosure.

FIG. 3B illustrates a partial cross-sectional schematic view, taken along the longitudinal centerline axis 12, of another exemplary spline connection 300' that may be employed to couple an input shaft coupling member 242' to an input shaft 210'. The spline connection 300' may be a fixed spline. The spline connection 300' includes a male spline 302' on a radially outer surface of the input shaft 210' that mates with a female spline 304' on a radially inner surface of the input shaft coupling member 242'. A first press fit 243 may be located at a forward end 253 between the input shaft 210' and the input shaft coupling member 242'. A second press fit 245 may be located at an aft end 255 between the input shaft 210' and the input shaft coupling member 242'. The input shaft coupling member 242' may abut and be adjacent to an aft shoulder 251 of the input shaft 210' that limits the axial location of the input shaft coupling member 242'. A fastening device 244' is secured to the input shaft 210' at the forward end. Therefore, the aft shoulder 251, the fastening device 244', the first press fit 243, and the second press fit 245' maintain the input shaft coupling member 242' and the input shaft 210' at a predetermined axial relationship. The male spline 302' and the female spline 304' enable transfer of rotation from the input shaft 210' to the input shaft coupling member 242' and thus to the gears, as described previously with respect to FIG. 2.

Figure 4:
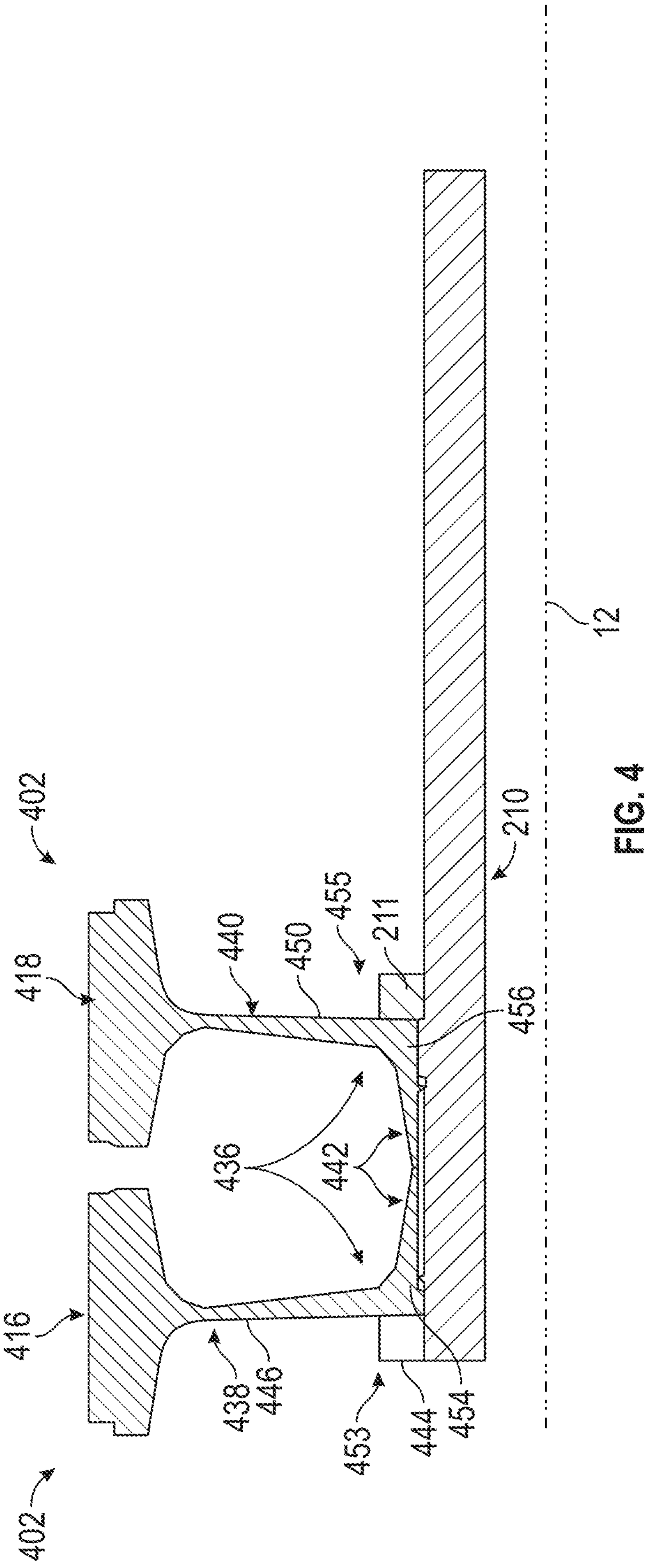
FIG. 4 illustrates a schematic cross-sectional view of a gearbox assembly for a turbine engine, taken along a longitudinal centerline axis of the gearbox assembly, according to the present disclosure.

FIG. 4 illustrates a partial cross-sectional view, taken along the longitudinal centerline axis 12, of an exemplary sun gear 402 that may be used with the gearbox assembly 200 of FIG. 2 in place of the sun gear 202. Accordingly, only the features that are different between the sun gear 202 and the sun gear 402 are described. All other features are understood to be the same as or substantially the same as those described with respect to the sun gear 202.

The sun gear 402 is a split sun gear 402 having a forward sun gear 416 and an aft sun gear 418, which are substantially the same as the forward sun gear 216 and the aft sun gear 218, with the following differences. As with the sun gear 202, the sun gear 402 is coupled to the input shaft 210 with a connection device 436. The connection device 436 couples each of the forward sun gear 416 and the aft sun gear 418 to the input shaft 210, but does not couple the forward sun gear 416 to the aft sun gear 418. The connection device 436 includes a forward support member 438, an aft support member 440, an input shaft coupling member 442, and a fastening device 444.

The forward support member 438 includes a first portion 446 that extends in the radial direction between the input shaft coupling member 442 and the forward sun gear 416. The aft support member 440 includes a first portion 450 that extends in the radial direction between the input shaft coupling member 442 and the aft sun gear 418.

The input shaft coupling member 442 includes a first portion 454 and a second portion 456 that each extends in an axial direction parallel to the input shaft 210. The first portion 454 rotationally couples the forward support member 438 and, thus, the forward sun gear 416 to the input shaft 210 and the second portion 456 couples the aft support member 440 and, thus, the aft sun gear 418 to the input shaft 210. The first portion 454 is integral with, or connected to, or coupled to the forward support member 438 and the second portion 456 is integral with, or connected to, or coupled to the aft support member 440.

Both the first portion 254 and the second portion 256 are rotationally coupled to the input shaft 210 such that rotation of the input shaft 210 causes rotation of the sun gear 402, in a manner that may be the same as, or similar to the manner described with respect to FIGS. 2 and 3. The forward fastening device 444 extends at an axially forward end 453 of the forward sun gear 416 to prevent axial movement of the sun gear 402 with respect to the input shaft 210 in the forward direction. A shoulder 211 of the input shaft 210 is located at an axially aft end 455 of the aft sun gear 418 to prevent axial movement of the sun gear 402 with respect to the input shaft 210 in the aft direction. Thus, the fastening device 444 is secured such that the forward support member 438, the aft support member 440, and the input shaft coupling member 442 are axially fixed to the input shaft 210. In this manner, the forward sun gear 416 and the aft sun gear 418 are rotationally coupled to the input shaft 210 by way of the connection device 436. The fastening device 444 may be a plurality of fastening devices circumferentially spaced about the longitudinal centerline axis 12 (FIG. 1) or may be a single annular fastening device extending circumferentially about the longitudinal centerline axis 12. As described herein, the fastening device 444 may be a bolt, screw, weld, anchor, river, or other mechanical fastener.

The illustration of FIG. 4 is a cross-sectional view taken along the longitudinal centerline axis 12 of the turbine engine 10 of FIG. 1, with half of the sun gear 402 omitted for simplicity. The sun gear 402, however, extends circumferentially about the longitudinal centerline axis 12 such that the forward sun gear 416, the aft sun gear 418, the forward support member 438, the aft support member 440, and the input shaft coupling member 442 are each annular members.

Figure 5A:
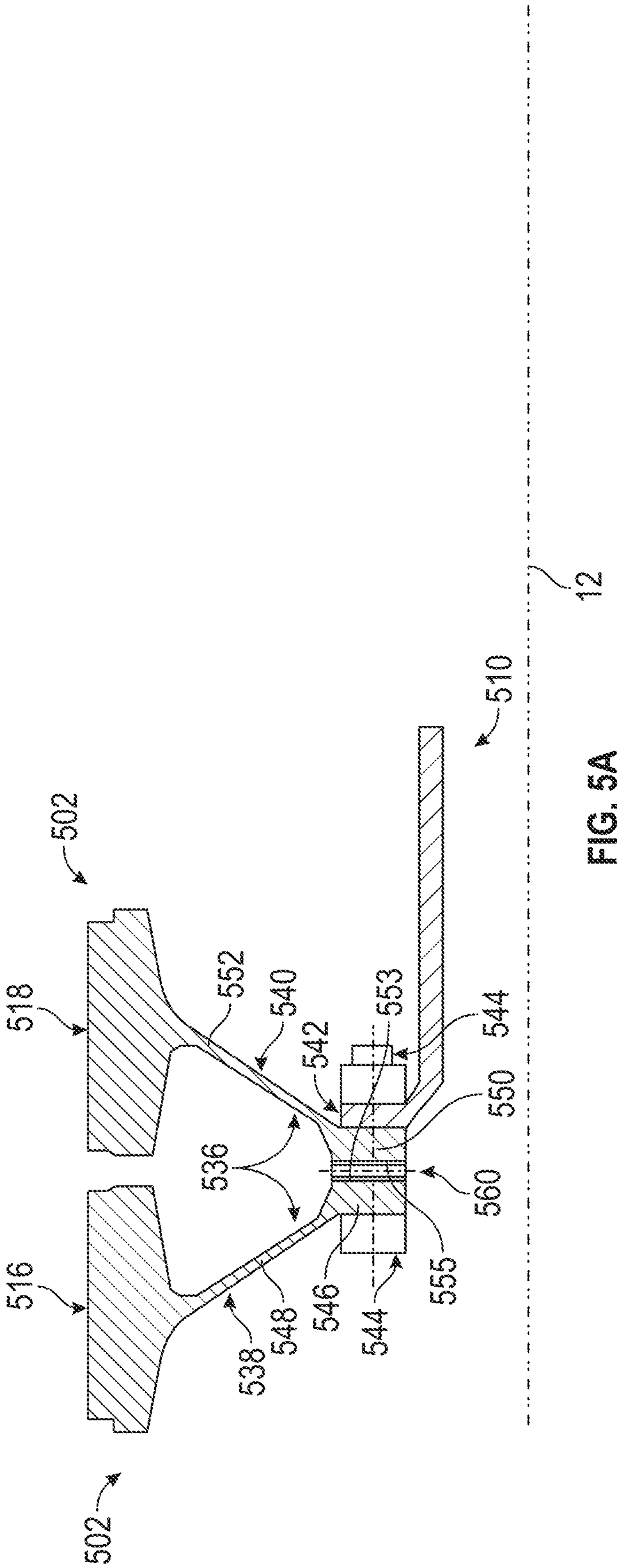
FIG. 5A illustrates a schematic cross-sectional view of a gearbox assembly for a turbine engine, taken along a longitudinal centerline axis of the gearbox assembly, according to the present disclosure.

FIG. 5A illustrates a partial cross-sectional view, taken along the longitudinal centerline axis 12, of an exemplary sun gear 502 that may be used with the gearbox assembly 200 of FIG. 2 in place of the sun gear 202. Accordingly, only the features that are different between the sun gear 202 and the sun gear 502 are described. All other features are understood to be the same as or substantially the same as those described with respect to the sun gear 202.

The sun gear 502 is a split sun gear 502 having a forward sun gear 516 and an aft sun gear 518, which are substantially the same as the forward sun gear 216 and the aft sun gear 218, with the following differences. As with the sun gear 202, the sun gear 502 is coupled to an input shaft 510 with a connection device 536. The connection device 536 couples the two separate components (e.g., the forward sun gear 516 and the aft sun gear 518) together and couples the sun gear 502 to the input shaft 510. The connection device 536 includes a forward support member 538, an aft support member 540, an input shaft coupling member 542, and a fastening device 544.

The forward support member 538 includes a first portion 546 and a second portion 548. The first portion 546 extends in the radial direction and includes an opening therethrough (not visible) for receiving the fastening device 544. The second portion 548 extends at an angle between the first portion 546 and the forward sun gear 516.

The aft support member 540 includes a first portion 550 and a second portion 552. The first portion 550 extends in the radial direction and includes an opening therethrough (not visible) for receiving the fastening device 544. The second portion 552 extends at an angle between the first portion 550 and the aft sun gear 518. The first portion 550 of the aft sun gear 518 is rotationally coupled to first portion 546 of the forward sun gear 516 with a coupling 560 such that rotation of the input shaft 510 causes rotation of the first portion 550, which causes rotation of the first portion 546, and, therefore, rotation of the sun gear 502. In the example of FIG. 5A, the coupling 560 is a curvic coupling, such as described in more detail with respect to FIG. 6.

The input shaft coupling member 542 extends in the radial direction on an aft side of and parallel to the first portion 550 of the aft support member 540. The input shaft coupling member 542 includes an opening therethrough (not visible) for receiving the fastening device 544. The input shaft coupling member 542 may extend directly from the input shaft 510. In some examples, the input shaft coupling member 542 is formed unitarily with the input shaft 510. In some examples, the input shaft coupling member 542 is coupled to the input shaft 510. The input shaft coupling member 542 is rotationally coupled to first portion 550 of the aft sun gear 518 such that rotation of the input shaft 510 causes rotation of the first portion 550 and, therefore, rotation of the sun gear 502. In the example of FIG. 5A, the first portion 550 is rotationally coupled to the input shaft coupling member 542 through the connection of the fastening device 544.

The fastening device 544 extends through respective openings in the first portion 546 of the forward support member 538, the first portion 550 of the aft support member 540, and the input shaft coupling member 542. The fastening device 544 is secured within the openings such that the forward support member 538, the aft support member 540, and the input shaft coupling member 542 are fixedly attached together. In this manner, the forward sun gear 516 and the aft sun gear 518 are rotationally coupled to the input shaft 510 by way of the connection device 536. Although the input shaft coupling member 542 is illustrated coupled to an axially aft side of the aft support member 540, other locations are contemplated, such as, for example, an axially forward side of the aft support member 540, an axially aft side of the forward support member 538, or an axially forward side of the forward support member 538.

The illustration of FIG. 5A is a cross-sectional view taken along the longitudinal centerline axis 12 of the turbine engine 10 of FIG. 1, with half of the sun gear 502 omitted for simplicity. The sun gear 502, however, extends circumferentially about the longitudinal centerline axis 12 such that the forward sun gear 516, the aft sun gear 518, the forward support member 538, the aft support member 540, and the input shaft coupling member 542 are each annular members. Accordingly, although a single fastening device 544 is shown and a single opening in each of the first portions 546, 550, and the input shaft coupling member 542 are described, a plurality of openings may be provided in a circumferentially spaced manner about the longitudinal centerline axis 12 to secure the sun gear 502 to the input shaft 510.

Figure 5B:
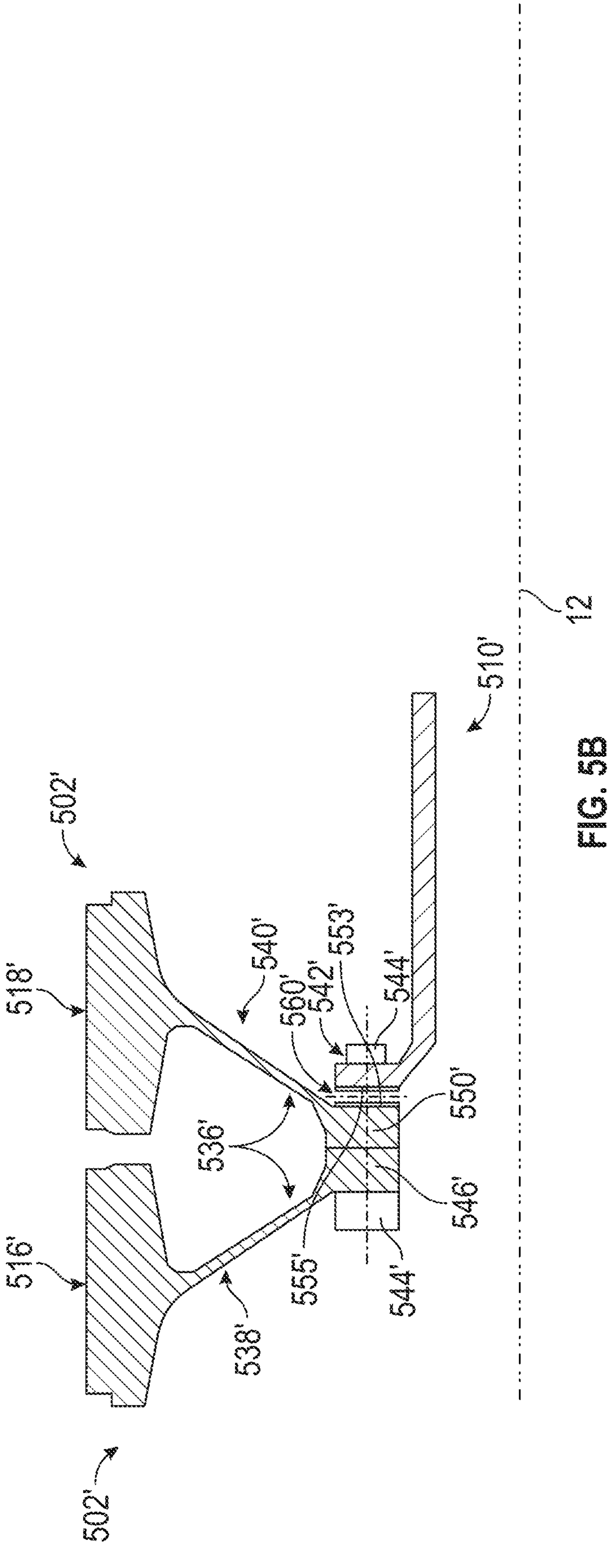
FIG. 5B illustrates a schematic cross-sectional view of a gearbox assembly for a turbine engine, taken along a longitudinal centerline axis of the gearbox assembly, according to the present disclosure.

FIG. 5B illustrates a partial cross-sectional view of an exemplary sun gear 502' that may be used with the gearbox assembly 200 of FIG. 2 in place of the sun gear 202. The sun gear 502' is similar to the sun gear 502 described with respect to FIG. 5A except for the location of the curvic coupling. Accordingly, only the features that are different between the sun gear 502 and the sun gear 502' are described. All other features are understood to be the same as or substantially the same as those described with respect to the sun gear 502.

The sun gear 502' is a split sun gear 502 having a forward sun gear 516' and an aft sun gear 518'. The sun gear 502' is coupled to an input shaft 510' with a connection device 536'. The connection device 536' couples the two separate components (e.g., the forward sun gear 516' and the aft sun gear 518') together and couples the sun gear 502' to the input shaft 510'. The connection device 536' includes a forward support member 538', an aft support member 540', an input shaft coupling member 542', and a fastening device 544'.

In FIG. 5A, the forward sun gear 516 is coupled to the aft sun gear 518 with the coupling 560 between an aft surface 553 of the first portion 546 and a forward surface 555 of the first portion 550. In FIG. 5B, however, an aft surface of the first portion 546' simply abuts a forward surface of the first portion 550' with no coupling 560 therebetween. Instead, a coupling 560' is provided between an aft surface 553' of the first portion 550' and a forward surface 555' of the input shaft coupling member 542'. The coupling 560' may be a curvic coupling such as described with respect to FIG. 6. Therefore, rotation of the input shaft 510' causes rotation of the sun gear 502' as described previously.

Figure 6:
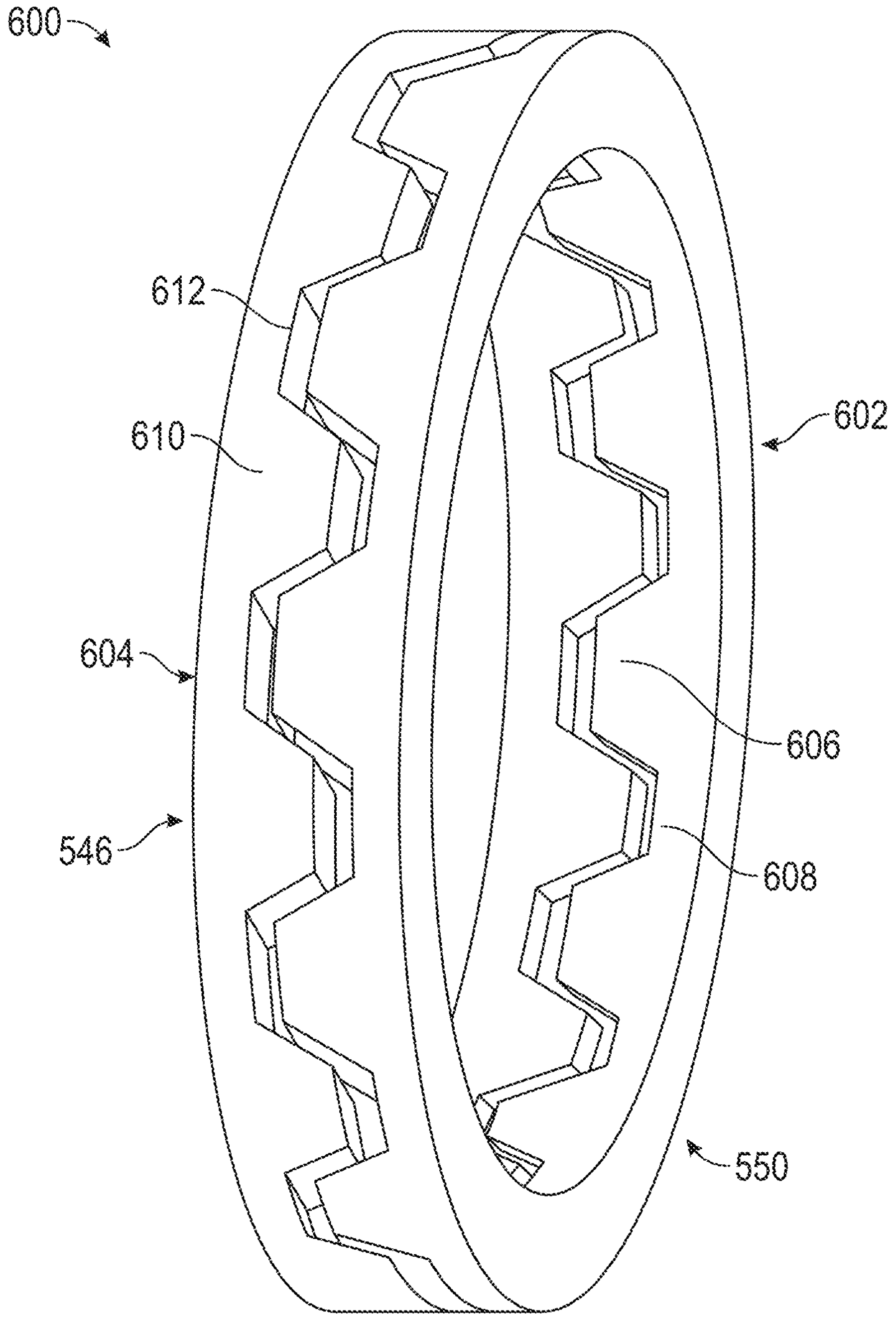
FIG. 6 illustrates a partial schematic view of a curvic connection for a connection device for coupling a sun gear of the gearbox assembly of FIG. 5A and FIG. 5B to an input shaft, according to the present disclosure.

FIG. 6 illustrates a partial view of an exemplary curvic connection 600 that may be employed to couple the first portion 546 of the forward support member 538 and the first portion 550 of the aft support member 540 (FIG. 5A). The first portion 546 and the first portion 550 are illustrated simply as cylinders in FIG. 6 solely to facilitate understanding of the curvic connection 600. The first portion 546 and the first portion 550 are arranged, however, as shown and described with respect to FIG. 5A. Likewise, when the curvic connection 600 is employed in the sun gear 502' of FIG. 5B, the first portion 546 shown in FIG. 6 may be the first portion 550' of FIG. 5B and the first portion 550 shown in FIG. 6 may be the input shaft coupling member 542' shown in FIG. 6.

The curvic connection 600 of FIG. 6 operates the same in FIGS. 5A and 5B, only the location of the coupling is different. Therefore, the following description refers to FIG. 5A only for simplicity, but similar arrangement is understood to be present between the first portion 550' and the input shaft coupling member 542'. The curvic connection 600 includes a first portion 602 on an axial surface (in the embodiment of FIG. 5A, an axially forward facing surface) of the first portion 550 and a second portion 604 on an axial surface (in the embodiment of FIG. 5A, an axially aft facing surface) of the first portion 546. The first portion 602 includes a plurality of first portion protrusions 606 and a plurality of first portion slots 608, and the second portion 604 includes a plurality of second portion protrusions 610 and a plurality of second portion slots 612. The plurality of first portion protrusions 606 are received within and mate with the plurality of second portion slots 612 and the plurality of second portion protrusions 610 are received within and mate with the plurality of first portion slots 608. Although a plurality of slots and protrusions are depicted, more or fewer than shown may be provided. The curvic connection 600 is not limited to the particular structure, shape, and dimensions illustrated in FIG. 6. Rather, other structures, shapes, and dimensions are contemplated that allow for rotational coupling between the input shaft 510 and the sun gear 502.

Figure 7:
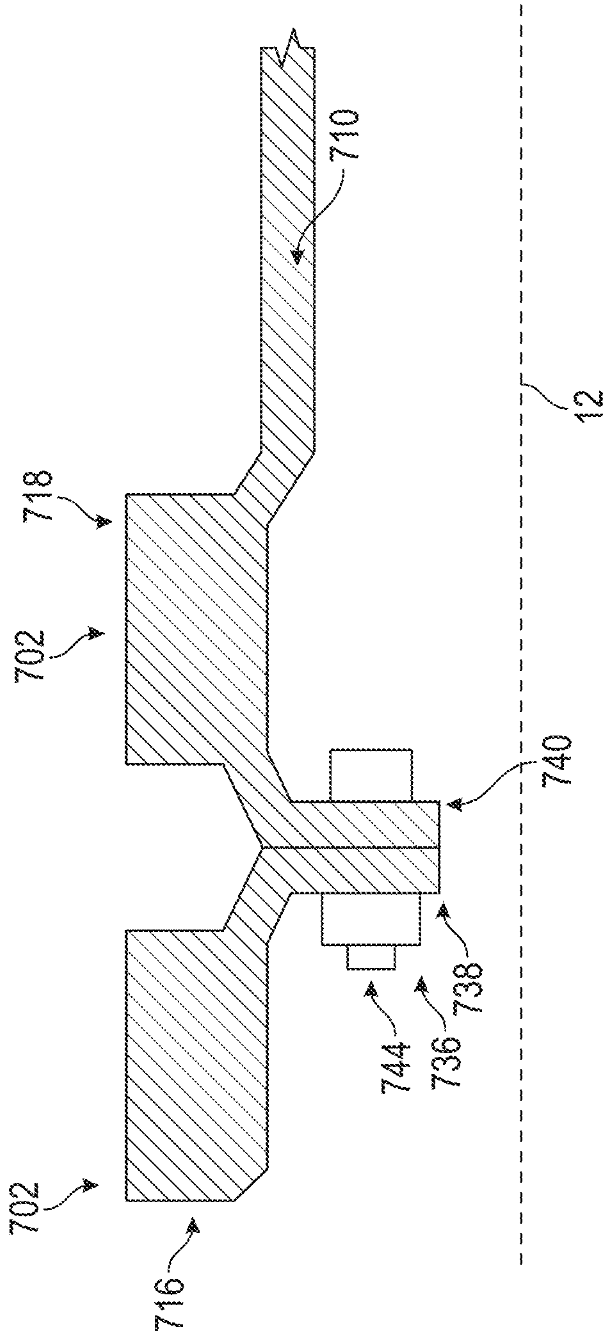
FIG. 7 illustrates a schematic cross-sectional view of a gearbox assembly for a turbine engine, taken along a longitudinal centerline axis of the gearbox assembly, according to the present disclosure.

FIG. 7 illustrates a partial cross-sectional view, taken along the longitudinal centerline axis 12, of an exemplary sun gear 702 that may be used with the gearbox assembly 200 of FIG. 2 in place of the sun gear 202. Accordingly, only the features that are different between the sun gear 202 and the sun gear 702 are described. All other features are understood to be the same as or substantially the same as those described with respect to the sun gear 202. The sun gear 702 is a split sun gear 702.

The sun gear 702 includes a forward sun gear 716 and an aft sun gear 718. The aft sun gear 718 is formed integrally and unitarily with an input shaft 710. Thus, rotation of the input shaft 710 rotates the aft sun gear 718. The forward sun gear 716 is coupled to the aft sun gear 718 with a connection device 736. The connection device 736 includes a forward support member 738 and an aft support member 740. The forward support member 738 and the aft support member 740 are coupled together with a fastening device 744. Thus, rotation of the aft sun gear 718 (due to rotation of the integrally formed input shaft 710) rotates the forward sun gear 716 due to the connection device 736.

Figure 8:
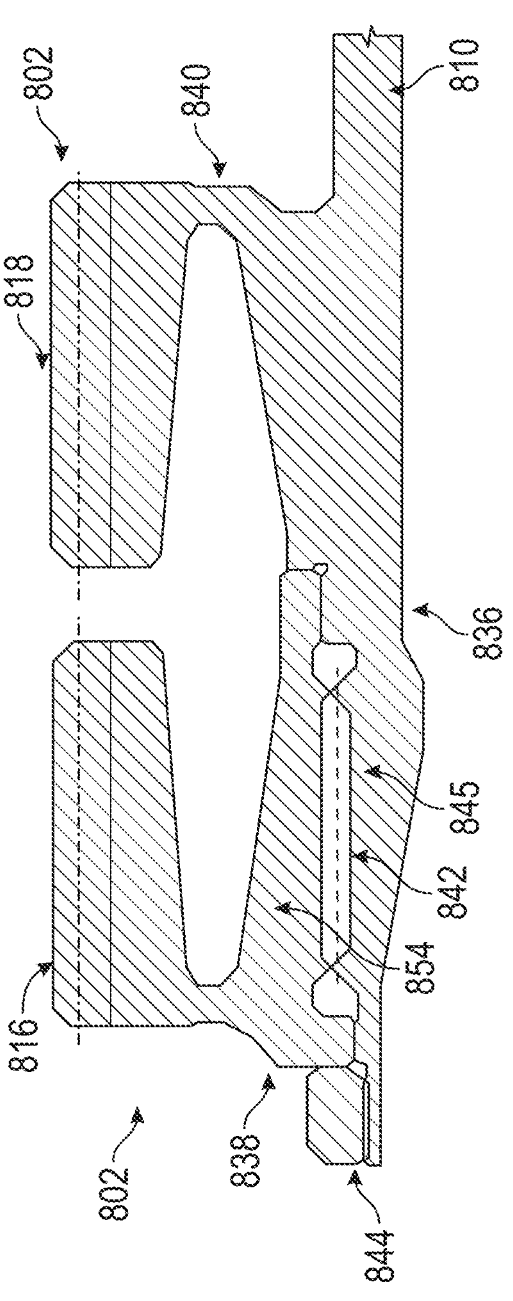
FIG. 8 illustrates a schematic cross-sectional view of a gearbox assembly for a turbine engine, taken along a longitudinal centerline axis of the gearbox assembly, according to the present disclosure.

FIG. 8 illustrates a partial cross-sectional view of an exemplary sun gear 802 that may be used with the gearbox assembly 200 of FIG. 2 in place of the sun gear 202. Accordingly, only the features that are different between the sun gear 202 and the sun gear 802 are described. All other features are understood to be the same as or substantially the same as those described with respect to the sun gear 202. The sun gear 802 is a split sun gear 802.

The sun gear 802 includes a forward sun gear 816 and an aft sun gear 818. The aft sun gear 818 is formed integrally and unitarily with an input shaft 810. An aft support member 840 supports the aft sun gear 818 on the input shaft 810. Thus, rotation of the input shaft 810 rotates the aft sun gear 818. The input shaft 810 includes an input shaft coupling member 842. The forward sun gear 816 is coupled to the input shaft coupling member 842 with a connection device 836. The connection device 836 includes a male spline 845 on the input shaft coupling member 842 and female splines 854 on the forward sun gear 816 and is thus a fixed spline as in FIG. 3B. The connection device 836 allows rotational coupling between the input shaft 810 and the forward sun gear 816. A forward support member 838 supports the forward sun gear 816 with respect to the female splines 854. and an aft support member 740. A fastening device 844 secures the forward sun gear 816 to the input shaft 810.

FIGS. 7 and 8 illustrate exemplary sun gears that combine various features from other embodiments. For example, FIG. 8 combines the integral aft sun gear of FIG. 7 with the fixed spline of FIG. 5B. Thus, any portion of the aforementioned embodiments may be combined with any other portion so long as the resulting combination is a split sun gear that rotates with the input shaft.

Figure 9:
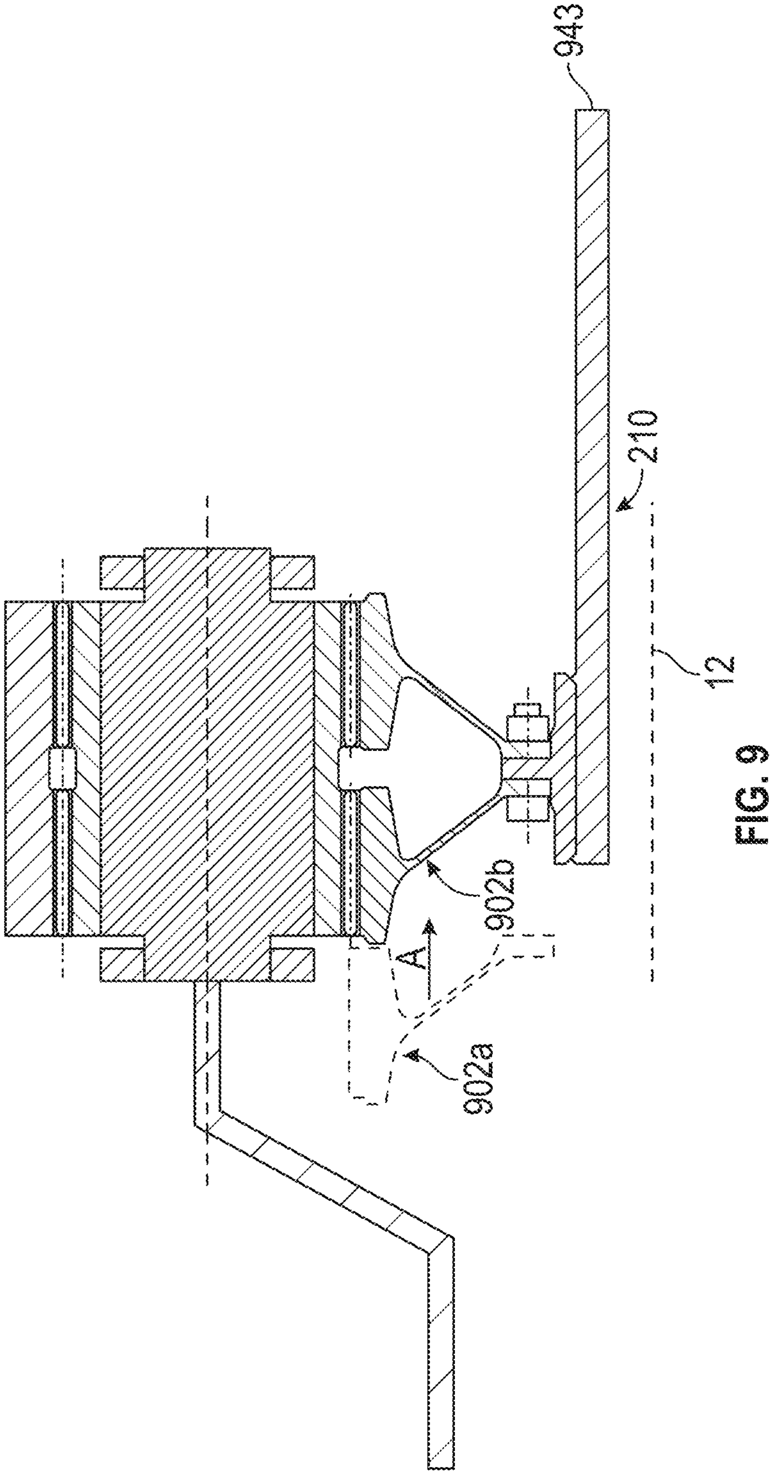
FIG. 9 illustrates a schematic cross-sectional view to show installation of a sun gear onto an input shaft, according to the present disclosure.

FIG. 9 illustrates a schematic cross-sectional view to show a portion of an installation process for a split sun gear, such as a split sun gear 202, 402, 502, 502', 702, or 802 as described herein. During installation of any of the split sun gears described herein, the aft sun gear (e.g., the aft sun gears 218, 418, 518, 518', 718, 818) is moved longitudinally in the axial direction A over a forward end 943 of the input shaft 210 (or the input shaft 510, 510', 710, or 810).

Figure 10:
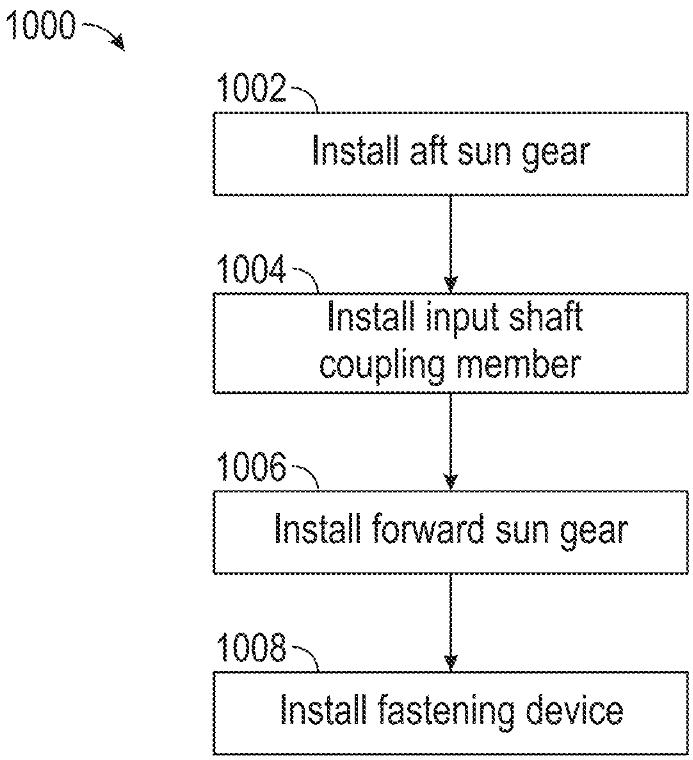
FIG. 10 illustrates a method of installing a split sun gear on an input shaft, according to the present disclosure.

In the example of the sun gear 202, and referring to FIGS. 2 and 9 and to the method 1000 of FIG. 10, the aft sun gear 218 is moved, at step 1002, longitudinally in the axial direction A over the forward end 943 of the input shaft 210. At step 1004, the input shaft coupling member 242 is moved longitudinally in the axial direction A over the forward end 943 of the input shaft 210 to a location adjacent to the aft sun gear 218. After the input shaft coupling member 242 is installed, at step 1006, the forward sun gear 216 is moved longitudinally in the axial direction A over the forward end 943 of the input shaft 210. The longitudinal motion of the components in the axial direction A is illustrated by the movement of the forward sun gear from the position 902*a* to the position 902*b* in FIG. 9. The fastening device 244 may then be secured, at step 1008, through the respective openings. In installing the sun gear 202, the protrusions and the slots of the spline connection are aligned when installing the input shaft coupling member 242 to ensure proper operation and proper rotational coupling of the input shaft 210 and the sun gear 202.

Figure 11:
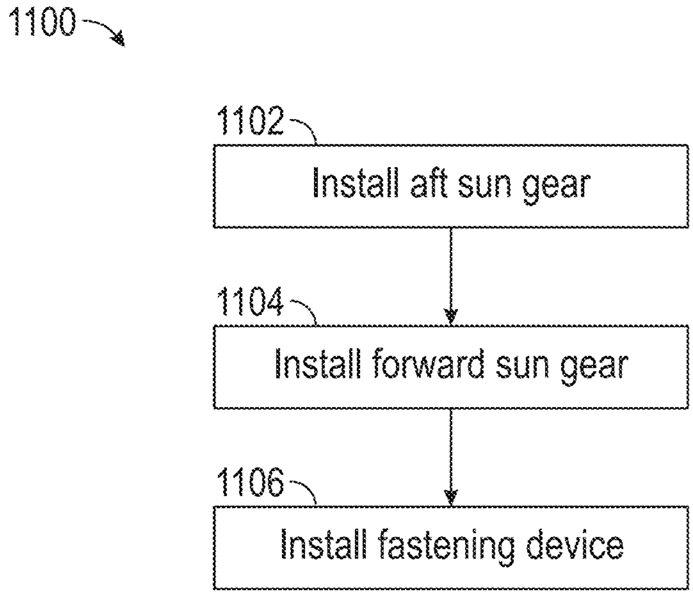
FIG. 11 illustrates a method of installing a split sun gear on an input shaft, according to the present disclosure.

Referring to FIG. 4 and the method 1100 of FIG. 11, in the example of the sun gear 402, the input shaft coupling member 442 is a part of each of the forward sun gear 416 and the aft sun gear 418. Therefore, the aft sun gear 418, including the aft portion of the input shaft coupling member 442, is moved longitudinally in the axial direction A, at step 1102, over the input shaft 210. After installation of the aft sun gear 418, at step 1104, the forward sun gear 416, along with the forward portion of the input shaft coupling member 442, is moved longitudinally in the axial direction A over the forward end 943 of the input shaft 210. The fastening device 444 may then be installed, at step 1106, at the forward end 943 of the input shaft 210 to prevent longitudinal movement of the sun gear 402 off the input shaft 210. In installing the sun gear 402, the protrusions and the slots of the spline connection are aligned when installing each of the aft sun gear 418 and the forward sun gear 416 to ensure proper operation and proper rotational coupling of the input shaft 210 and the sun gear 402.

Figure 12:
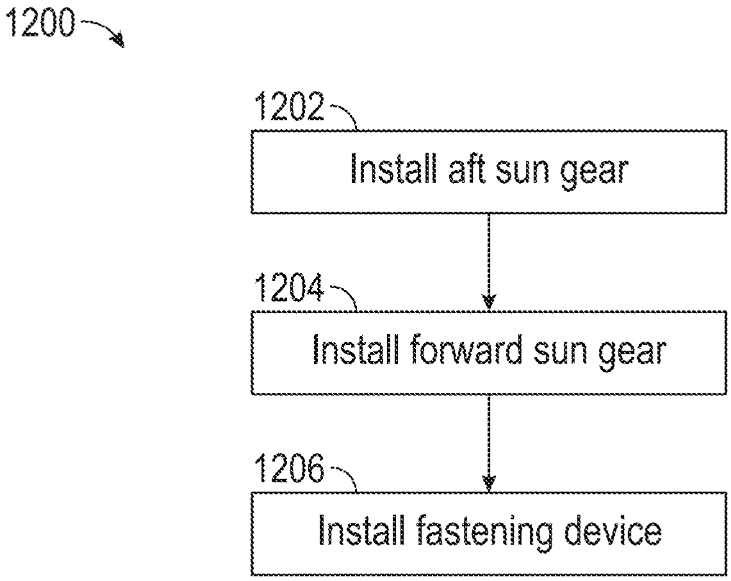
FIG. 12 illustrates a method of installing a split sun gear on an input shaft, according to the present disclosure.

Referring to FIG. 5A and the method 1200 of FIG. 12, in the example of the sun gear 502, the input shaft coupling member 542 is either previously installed on the input shaft 510 prior to installation of the aft sun gear 518, or is optionally integral and unitary with the input shaft 510 such that no installation is required. In either case, the aft sun gear 518 is aligned with an aft end of the input shaft coupling member 542 at step 1202. After the aft sun gear 518 is aligned with the input shaft 510, the forward sun gear 516 is moved longitudinally in the axial direction A, at step 1204, to align with the aft sun gear 518. The openings through the aft sun gear 518 and the forward sun gear 516 are aligned during step 1204. The fastening device 544, at step 1206, may then be secured through the respective openings. In installing the sun gear 502, the protrusions and the slots of the curvic connection are aligned when installing the forward sun gear 516 to ensure proper operation and proper rotational coupling of the input shaft 510 and the sun gear 502. Referring to FIG. 5B, in installing the sun gear 502', the only difference is that the protrusions and the slots of the curvic connection are aligned when installing the aft sun gear 518' to ensure proper operation and proper rotational coupling of the input shaft 510' and the sun gear 502'.

Figure 13:
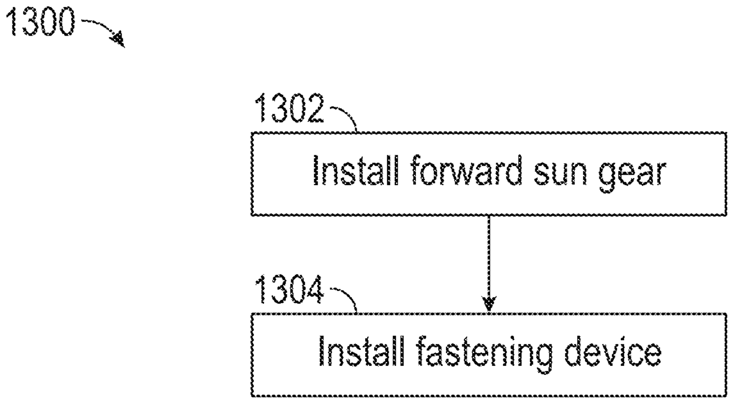
FIG. 13 illustrates a method of installing a split sun gear on an input shaft, according to the present disclosure.

Referring to FIG. 7 and the method 1300 of FIG. 13, in the example of the sun gear 702, the aft sun gear 718 is integral with the input shaft 710. Thus, to install the sun gear 702, the forward sun gear 716 is moved longitudinally in the axial direction A, at step 1302, to mate the forward support member 738 with the aft support member 740. The fastening device 744, at step 1304, may then be secured through the respective openings.

Referring to FIG. 8, in the example of the sun gear 802, the aft sun gear 818 is integral with the input shaft 810. Thus, to install the sun gear 802, the method 1300 of FIG. 13 applies. In the example of the sun gear 802, the forward sun gear 816 is moved longitudinally over the input shaft 810 in the axial direction A. The fastening device 844 may then be secured through the respective openings. In installing the sun gear 802, the protrusions and the slots of the spline connection are aligned when installing the forward sun gear 816 to ensure proper operation and proper rotational coupling of the input shaft 810 and the sun gear 802.

Figure 14:
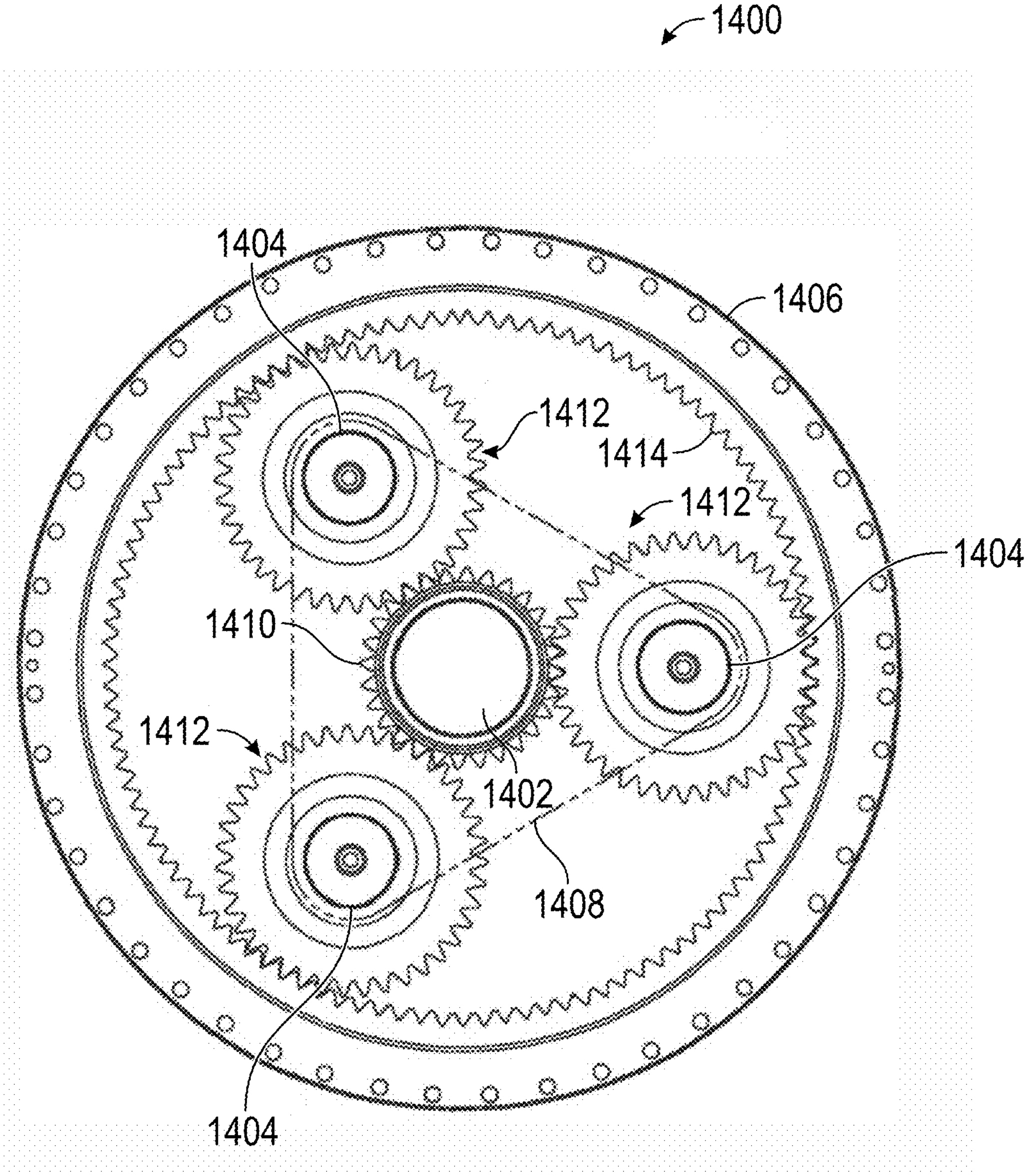
FIG. 14 shows a partial schematic diagram of an epicyclic gear train including a planet gear, according to the present disclosure.

FIG. 14 is a schematic diagram of an epicyclic gear train 1400. The epicyclic gear train 1400 is housed within a gearbox assembly, such as the gearbox assembly 52 of FIG. 1. In other examples, the epicyclic gear train 1400 can be adjacent the gearbox assembly 52 and can be mechanically coupled to the gearbox assembly 52. The epicyclic gear train 1400 includes a sun gear 1402, a plurality of planet gears 1404, a ring gear 1406, and a carrier 1408. In some examples, the sun gear 1402 can share certain similar features with other sun gears disclosed herein, such as any of sun gears 202, 402, 502, 502', 702, or 802. For example, the sun gear 1402 can be a split sun gear with a forward sun gear and an aft sun gear separate from the forward sun gear. In some examples, the planet gears 1404 can share certain similar features with other planet gears disclosed herein, such as planet gears 204. In some examples, one or more of the planet gears 1404 can be used in the gearbox assembly 52 in lieu of one or more of the planet gears 204. In some examples, the ring gear 1406 can be share certain similar features with other ring gears disclosed herein, such as ring gear 206. In some examples, the carrier 1408 can share certain similar features with other carriers disclosed herein, such as carrier 208.

Although the epicyclic gear train 1400 is depicted in FIG. 14 as including three planet gears 1404, the epicyclic gear train 1400 can include any number of planet gears 1404 that enable the operation of the epicyclic gear train 1400 as described herein. The number of planet gears 1404 is in a range from three planet gears 1404 to six planet gears 1404. In some examples, the number of planet gears 1404 can be three, four, five, or six planet gears 1404.

The LP shaft 40 (FIG. 1) is coupled to the sun gear 1402. The sun gear 1402 engages the plurality of planet gears 1404 through a plurality of complementary sun gear teeth 1410 and a plurality of planet gear teeth 1412 circumferentially spaced about a radially outer periphery of the sun gear 1402 and a radially outer periphery of each of the plurality of planet gears 1404, respectively. In some examples, the sun gear 1402 can be a double helical gear and the sun gear teeth 1410 can include two rows of helical teeth (similar to sun gear teeth 220, 222 shown in FIG. 2) that are of opposing helix angles. In some examples, the planet gears 1404 can be double helical gears, and the planet gear teeth 1412 can include two rows of helical teeth (similar to planet gear teeth 224, 226 shown in FIG. 2) that are of opposing helix angles.

The plurality of planet gears 1404 is maintained in a position relative to each other by the carrier 1408. The plurality of planet gears 1404 engage the ring gear 1406 through a plurality of ring gear teeth 1414 complementary to the planet gear teeth 1412. The ring gear teeth 1414 are circumferentially spaced about a radial inner periphery of the ring gear 1406 and planet gear teeth 1412 are circumferentially spaced about a radial outer periphery of each of the plurality of planet gears 1404. The carrier 1408 is rotationally coupled to the plurality of fan blades 44.

A sum of the number of ring gear teeth 1414 and sun gear teeth 1410 divided by the number of sun gear teeth 1410 is defined herein as the gear ratio (GR) of the epicyclic gear train 1400. In some examples where the epicyclic gear train 1400 is housed within the gearbox assembly 52, the gear ratio can also be the gear ratio of the gearbox assembly 52. The gear ratio, which is dimensionless, is a value that can be from 2.5 to 5, 3.2 to 4.0, or 3.5 to 4.0.

The epicyclic gear train 1400 is a planetary configuration, in which the ring gear 1406 remains stationary while the sun gear 1402, the plurality of planet gears 1404, and the carrier 1408 rotate. The LP shaft 40 (FIG. 1) drives the sun gear 1402, which rotates the plurality of planet gears 1404, which causes rotation in the carrier 1408. The carrier 1408 drives the plurality of fan blades 44. When the epicyclic gear train 1400 is in the planetary configuration, the sun gear 1402 and the carrier 1408 rotate in the same direction.

Figure 15:
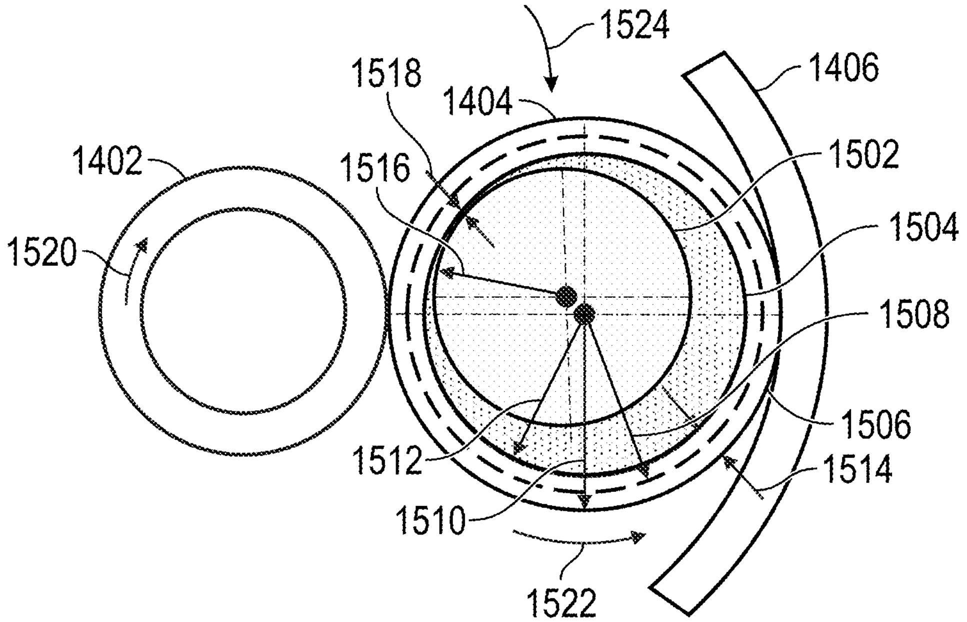
FIG. 15 shows a partial schematic diagram of the epicyclic gear train of FIG. 14.

FIG. 15 is a partial and schematic diagram of the epicyclic gear train 1400 in a planetary configuration showing a ring gear rim of the ring gear 1406 and a planet gear rim 1506 of the planet gear 1404, a bearing pin 1502, and a sun gear rim of the sun gear 1402. Shown are each of the sun gears 1402, planet gears 1404, and ring gears 1406 represented by a "rim" having an inner radius and outer radius as measured from the center of the planet gear.

The bearing pin 1502 (which can share certain similar features with portions the pin 232, particularly in examples where the pin 232 includes a journal bearing) is located within the planet gear 1404. A lubricant or fluid film 1504 is disposed between the bearing pin 1502 and the planet gear 1404 to provide lubrication between the outer surface of the bearing pin 1502 (i.e., a pin outer surface located at a radial distance 1516 from the center of the bearing pin 1502) and an inner surface of the planet gear 1404 (located at a radial distance 1512 from the center of the planet gear 1404). The planet gear rim 1506 is defined as the portion of the planet gear 1404 from the inner surface of the planet gear 1404 to the portion of the planet gear 1404 located a radial distance 1510 from the center of the planet gear 1404 corresponding to a gear root radius (i.e., the radial location of the roots of the planet gear teeth 1412). The planet gear rim 1506 has a thickness 1514 and a neutral axis of bending (as indicated by the dashed line) located at radial distance 1508 from the center of the planet gear 1404. The radial distance 1508, hereinafter referred to as the bending stress neutral axis radius ($r_p$), is the radial location where normal stresses in the planet gear rim 1506 associated with bending of the planet gear 1404 in the plane of FIG. 15, e.g., pinching of the planet gear 1404 between the sun gear 1402 and ring gear 1406, are equal to zero. The planet gear bending stress neutral axis radius ($r_p$) 1508, measured in inches, is determined to be a value in a range from 1.5 inches to 4.0 inches according to the disclosure.

The carrier 1408 (FIG. 14) is coupled to the bearing pin 1502, such that rotation of the sun gear 1402, which in turn causes the planet gears 1404 to rotate, induces rotation in the carrier 1408. Thus, torque from the LP shaft 40 (FIG. 1) is transferred via the sun gear 1402, the planet gear 1404, and the carrier 1408 coupled to the plurality of fan blades 44 (FIG. 1). This torque transfer induces significant loads on the epicyclic gear train 1400, both in terms of the loads generated by the torque transfer and the associated off-axis loads, as explained in greater detail below. Given this significant loading on such a gearbox assembly, the design of the gearbox assembly elements to ensure that metal to metal contact is avoided during high load conditions (i.e., takeoff) without imposing unacceptable burdens on the architecture in terms of weight, size, and thermal management systems is needed to support proper functioning.

Referring again to FIG. 15, the resultant loading of the epicyclic gear train 1400 when a torque is transferred from the LP shaft 40 through the epicyclic gear train 1400 and output to the fan blades 44 urges the planet gear 1404 (represented in FIG. 15 as the rim 1506) towards the outer surface of the bearing pin 1502, which in some examples can comprise a journal bearing without any rolling elements. The fluid film 1504 is disposed between the inner surface of the planet gear 1404 and the outer surface of the bearing pin 1502 to avoid metal-to-metal contact between the parts and to permit the planet gear 1404 to freely rotate about the bearing pin 1502. The bearing pin 1502 includes a bearing pin radius 1516. A clearance ($c_r$) 1518 is the minimum radial distance between the bearing pin 1502 and the planet gear rim 1506 when epicyclic gear train 1400 is under a loaded condition (i.e., when a torque is being transferred from the LP shaft 40 to the fan blades 44). The inventors determined that in order to reliably maintain operating conditions through a suitable number of cycles, taking into account the different aircraft mission requirements, the clearance ($c_r$) should be within a range of 0.00075 inches to 0.012 inches. If the clearance ($c_r$) were less than 0.00075 inches, then it is more likely that at least some metal-to-metal contact would result (resulting in higher friction, significant heat generation and possibly leading to gearbox failure). On the other hand, a clearance that is excessively high (above 0.012 inches) can also reduce bearing performance. The inventors found that with a clearance above 0.012 inches the desired oil pressure between the pin and gear cannot be reliably maintained. The bearing stiffness is reduced if the clearance is too high.

The planet gear 1404 can include at least one material selected from a plurality of alloys including, but not limited to, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some examples, the metal materials can be nitride to improve the life and resistance to particle damage. Planet gear 1404 can include any combination of alloys and any percent weight range of those alloys that facilitates operation of the planet gear 1404 as described herein, including but not limited to combinations of M50 Nil (AMS6278), Pyrowear 675 (AMS5930), and Ferrium C61 (AMS6517). The planet gear 1404 can have a Young's modulus of elasticity which is dependent on the material used to construct the planet gear 1404. The Young's modulus of elasticity can be defined as the ratio of the stress (force per unit area) along an axis to the strain (ratio of deformation over initial length) along that axis in the range of stress in which Hooke's law holds.

During operation, when the epicyclic gear train 1400 is in a planetary configuration, the LP shaft 40 (FIG. 1) rotates, applying a torque to the sun gear 1402 in a clockwise direction as indicated by a first arrow 1520. The sun gear 1402, in turn, rotates, causing the planet gears 1404 to rotate in a counter-clockwise direction as indicated by a second arrow 1522. The planet gear 1404, in turn, causes the carrier 1408 (FIG. 14) to rotate in a clockwise direction as indicated by a third arrow 1524.

Figure 16:
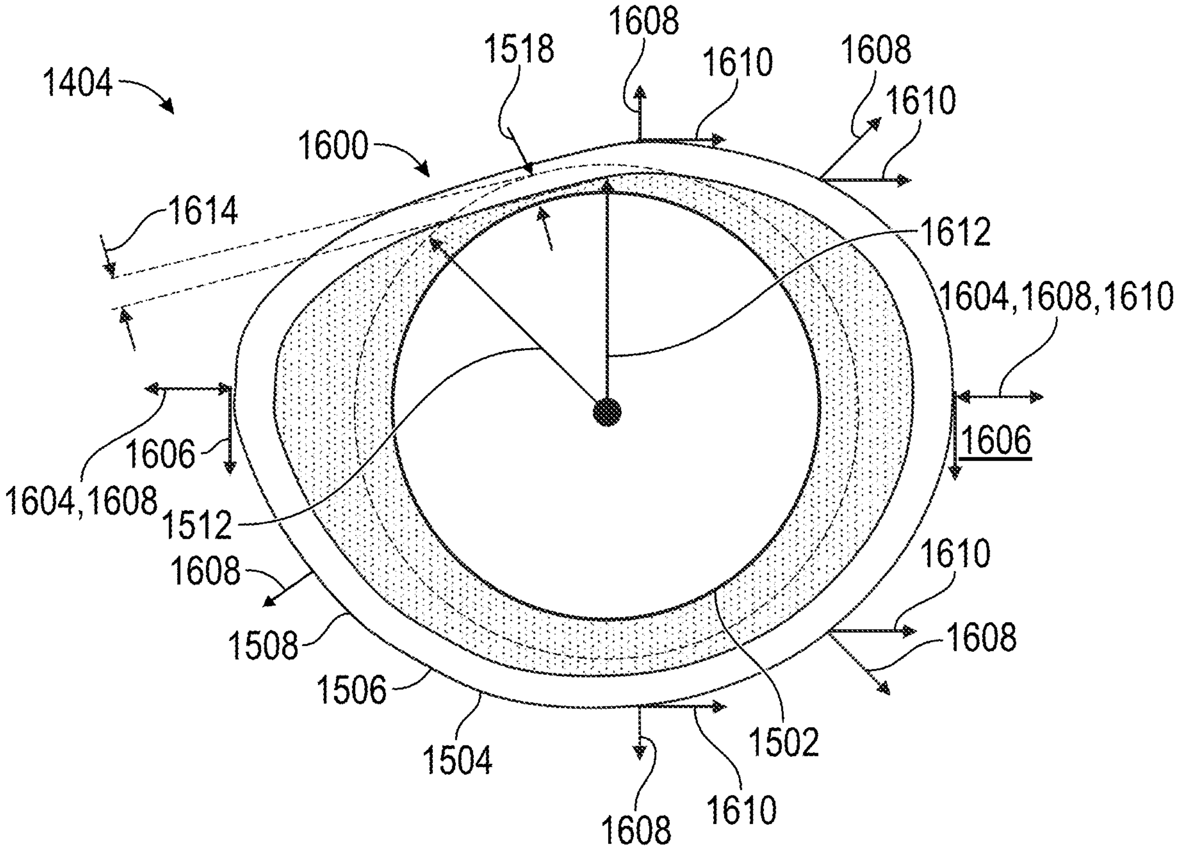
FIG. 16 shows a schematic diagram of the planet gear of FIG. 15, with resultant tangential, radial, pinch, and centrifugal forces causing the planet gear rim to deform, according to the present disclosure.

FIG. 16 is a schematic diagram of the planet gear 1404 with resultant radial, pinch, transverse, and centrifugal forces causing a deformation 1600 of the planet gear rim 1506. Torsion input from the LP shaft 40 (FIG. 1) causes the sun gear 1402 (FIG. 14) to exert pinch component forces 1604 and tangential component forces 1606 on the planet gear rim 1506. The pinch component forces 1604 and the tangential component forces 1606 are caused by the radial and tangential components, respectively, of the force exerted through the planet gear teeth 1412 (FIG. 14) from the sun gear 1402 on one side and from the ring gear 1406 (FIG. 14) on the other side. The pinch component forces 1604 are directed radially inwards at locations where the planet gear 1404 contacts the sun gear 1402 (FIG. 14) and the ring gear 1406 (FIG. 14). The tangential component forces 1606 are tangential to the planet gear rim 1506 at locations where the planet gear 1404 contacts the sun gear 1402 (FIG. 14) and the ring gear 1406 (FIG. 14).

Radial component forces 1608 extend radially outwards from the center of the planet gear 1404 resulting from a radial component of the force exerted on the planet gear 1404 from the rotation of the planet gear 1404 about the bearing pin 1502. Centrifugal component forces 1610 are the forces resulting from the precession of the planet gear 1404 about the sun gear 1402 (FIG. 14). In some examples, the centrifugal component forces 1610 are greater in magnitude than the pinch component forces 1604 and/or the tangential component forces 1606.

The resultant pinch component forces 1604, tangential component forces 1606, radial component forces 1608, and centrifugal component forces 1610 cause deformation 1600 of the planet gear rim 1506. The pinch component forces 1604 inwardly deform the planet gear rim 1506 towards the bearing pin 1502. The tangential component forces 1606 elongate the planet gear rim 1506 in a direction opposite the path of the planet gear 1404. The radial component forces 1608 deform the planet gear rim 1506 in a radially outward direction. The centrifugal component forces 1610 elongate the planet gear rim 1506 in a direction radially outwards from the sun gear 1402. The deformation 1600 results in the clearance 1518 being reduced by a change in clearance 1614, which is a radial distance between the inner radius 1512 and a deformed inner radius 1612.

Enhanced performance of the epicyclic gear train 1400 (FIG. 14) can be achieved when the clearance 1518 is greater than the change in clearance 1614. In other words, enhanced results can be achieved when the planet gear rim 1506 does not deform or bend such that the planet gear rim 1506 contacts the surface of the bearing pin 1502 when resultant radial component forces 1608, pinch component forces 1604, tangential component forces 1606, and centrifugal component forces 1610 are exerted on the planet gear rim 1506.

It is desirable to have the epicyclic gear train 1400 (FIG. 14) designed to maintain a minimum clearance 1518 during high load condition for the gas turbine engine 10, such as during a take-off, as this beneficially minimizes metal-to-metal contact within the planet gear 1404.

The inventors discovered that a minimum clearance can be maintained by identifying the specific conditions of the gas turbine engine 10 likely to cause a maximum deformation of the planet gear 1404 and relating those conditions to gearbox design. The inventors discovered a relationship that enabled them to determine an appropriate sizing for the planet gear 1404 (specifically, the location of the planet gear bending stress neutral axis radius ($r_p$) 1508) for a given number of planet gears 1404 and gear ratio, based on the loading conditions for the gearbox during a takeoff condition so that a minimum clearance can be maintained. The relation discovered, referred to by the inventors as a pin clearance parameter (PCP) with units of revolutions per minute (rpm), is given in (1):

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right] \quad (1)$$

wherein "$c_r$" is the clearance 1518 of the bearing pin 1502 (journal bearing) measured in inches, "GR" is the gear ratio defined as the ratio of the sum of the number of ring gear teeth 1414 and sun gear teeth 1410 divided by the number of sun gear teeth 1410, "$r_p$" is the planet gear bending stress neutral axis radius 1508 measured in inches, "$N_p$" is the number of planet gears 1404, "HP fan" is the fan power, measured in horsepower, of the gas turbine engine 10 based on takeoff conditions, and "$\Omega_{fan}$" is the fan speed, measured in rpm, of the gas turbine engine 10 at on takeoff conditions measured in rpm. A first constant, $K_1$, has a value of $1.96\times10^{-5}$ per horsepower-minute-inch ($hp^{-1}\cdot min^{-1}\cdot in.^{-1}$). A second constant, $K_2$, has a value of $4.91\times10^{-9}$ horsepower-minutes cubed per cubic inch ($hp\cdot min^3/in^3$). The inventors found that if the following inequality was satisfied, a minimum clearance can be maintained during takeoff conditions:

$$0\ rpm \leq PCP \leq 3{,}334\ rpm \quad (2)$$

In other examples, where a design space is more limited by engine architecture or gearbox design, the range in (2) can be greater than or equal to zero rpm and less than or equal to 3,000 rpm, greater than or equal to 48 rpm and less than or equal to 3,000 rpm, greater than or equal to 48 rpm and less than or equal to 1,334 rpm, or greater than or equal to 80 rpm and less than or equal to 1,300 rpm.

FIG. 17 discloses gear ratios, fan powers, fan speeds, numbers of gears, planet gear bending stress neutral axis radii 1508 (FIG. 15), clearances 1518 (FIGS. 15-16), and pin clearance parameters for multiple exemplary epicyclic gear trains 1400 (FIG. 14).

FIG. 18 discloses units and exemplary ranges for gear ratios, fan powers, fan speeds, numbers of gears, planet gear bending stress neutral axis radii 1508 (FIG. 15), clearances 1518 (FIG. 15), and pin clearance parameters.

Further aspects are provided by the subject matter of the following clauses.

A turbine engine comprises a core engine coupled to an input shaft, a fan coupled to an output shaft, and a gearbox assembly, wherein a torque is transferrable from the input shaft to the output shaft through the gearbox assembly. The gearbox assembly comprises a split sun gear rotationally coupled to the input shaft, a plurality of planet gears located radially outward of, and intermeshing with, the split sun gear, and a single piece ring gear located radially outward of, and intermeshing with, the plurality of planet gears. The split sun gear having a forward sun gear and an aft sun gear separate from the forward sun gear, wherein the forward sun gear and the aft sun gear are each rotationally coupled to the input shaft.

The turbine engine of any clause herein, the wherein the split sun gear is a double helical gear.

The turbine engine of any clause herein, the gearbox assembly further comprising a connection device for rotationally coupling the split sun gear to the input shaft.

The turbine engine of any clause herein, the connection device comprising a forward support member, an aft support member, and an input shaft coupling member.

The turbine engine of any clause herein, wherein the forward support member extends between the input shaft and the forward sun gear, the aft support member extends between the input shaft and the aft sun gear, and the input shaft coupling member rotationally couples the forward sun gear and the aft sun gear to the input shaft.

The turbine engine of any clause herein, wherein the input shaft coupling member is rotationally coupled to the input shaft with a spline connection.

The turbine engine of any clause herein, wherein a first portion of the input shaft coupling member extends from the forward support member and a second portion of the input shaft coupling member extends from the aft support member.

The turbine engine of any clause herein, wherein the first portion and the second portion extend axially and parallel with a longitudinal centerline axis of the input shaft.

The turbine engine of any clause herein, wherein the first portion is integral with the forward support member and the second portion is integral with the aft support member.

The turbine engine of any clause herein, further comprising a fastening device coupled to a forward side of the forward sun gear to secure the split sun gear in an axial direction on the input shaft.

The turbine engine of any clause herein, wherein the first portion and the second portion each comprises a spline connection with the input shaft.

The turbine engine of any clause herein, wherein the forward support member is rotationally coupled to the aft support member with a curvic connection.

The turbine engine of any clause herein, wherein an axially forward facing surface of the input shaft coupling member comprises a first portion of the curvic connection and an axially aft facing surface of the aft support member comprises a second portion of the curvic connection, the first portion of the curvic connection and the second portion of the curvic connection mating to form a rotational coupling between the input shaft coupling member and the aft support member such that rotation of the input shaft causes rotation of the input shaft coupling member and thus causes rotation of the split sun gear.

The turbine engine of any clause herein, wherein the aft support member is rotationally coupled to the input shaft coupling member with a curvic coupling.

The turbine engine of any clause herein, wherein the curvic connection comprises a plurality of protrusions and a plurality of slots on the axially forward-facing surface of the input shaft coupling member that mate with a respective plurality of slots and a plurality of protrusions on the axially aft facing surface of the aft support member.

The turbine engine of any clause herein, wherein each of the forward support member, the aft support member, and the input shaft coupling member comprises a first portion and a second portion.

The turbine engine of any clause herein, further comprising a fastening device extending through the first portion of each of the forward support member, the aft support member, and the input shaft coupling member to secure the forward sun gear and the aft sun gear in an axial direction with respect to the input shaft.

The turbine engine of any clause herein, wherein the first portion of the forward support member extends in a radial direction and the second portion of the forward support member extends at an angle between the first portion of the forward support member and the forward sun gear, the first portion of the aft support member extends in the radial direction and the second portion of the aft support member extends at an angle between the first portion of the aft support member and the aft sun gear, and the first portion of the input shaft coupling member extends in the radial direction and the second portion of the input shaft coupling member extends in an axial direction parallel to a longitudinal centerline axis of the turbine engine.

The turbine engine of any clause herein, wherein the first portion of each of the forward support member, the aft support member, and the input shaft coupling member extends parallel to each other.

The turbine engine of any clause herein, wherein a radially inner surface of the second portion of the input shaft coupling member comprises a first portion of a spline connection and a radially outer surface of the input shaft comprises a second portion of the spline connection, the first portion of the spline connection and the second portion of the spline connection mating to form a rotational coupling between the input shaft and the input shaft coupling member such that rotation of the input shaft causes rotation of the input shaft coupling member and thus causes rotation of the split sun gear.

The turbine engine of any clause herein, wherein the spline connection comprises a plurality of protrusions and a plurality of slots on the radially inner surface of the second portion of the input shaft coupling member that mate with a respective plurality of slots and a plurality of protrusions on the radially outer surface of the input shaft.

The turbine engine of any clause herein, wherein the gearbox assembly comprises a planet carrier for constraining the plurality of planet gears, the planet carrier coupled to the output shaft.

The turbine engine of any clause herein, the turbine engine further comprising a low-pressure shaft coupled to the output shaft and the fan via the gearbox assembly, wherein the low-pressure shaft is drivingly coupled to the input shaft such that rotation of the low-pressure shaft rotates the input shaft.

The turbine engine of any clause herein, further comprising a fastening device extending through each of the forward support member, the aft support member, and the input shaft coupling member to secure the forward sun gear and the aft sun gear in the axial direction.

The turbine engine of any clause herein, wherein the spline connection is a fixed spline.

The turbine engine of any clause herein, wherein the spline connection is a working spline.

A gearbox assembly comprising a split sun gear, a single piece ring gear, and a plurality of planet gears. The split sun gear having a forward sun gear and an aft sun gear separate from the forward sun gear, wherein the forward sun gear and the aft sun gear are each rotationally coupled to the input shaft.

The gearbox assembly of the preceding clause, wherein the split sun gear is rotationally coupled to a shaft of a turbine engine, the plurality of planet gears are located radially outward of, and intermeshing with, the split sun gear, and the single piece ring gear is located radially outward of, and intermeshing with, the plurality of planet gears.

The gearbox assembly of any clause herein, the wherein the split sun gear is a double helical gear.

The gearbox assembly of any clause herein, further comprising a connection device for rotationally coupling the split sun gear to the shaft.

The gearbox assembly of any clause herein, the connection device comprising a forward support member, an aft support member, and an input shaft coupling member.

The gearbox assembly of any clause herein, wherein the forward support member extends between the shaft and the forward sun gear, the aft support member extends between the shaft and the aft sun gear, and the shaft coupling member rotationally couples the forward sun gear and the aft sun gear to the shaft.

The gearbox assembly of any clause herein, wherein the input shaft coupling member is rotationally coupled to the shaft with a spline connection.

The gearbox assembly of any clause herein, wherein a first portion of the input shaft coupling member extends from the forward support member and a second portion of the input shaft coupling member extends from the aft support member.

The gearbox assembly of any clause herein, wherein the first portion and the second portion extend axially and parallel with a longitudinal centerline axis of the input shaft.

The gearbox assembly of any clause herein, wherein the first portion is integral with the forward support member and the second portion is integral with the aft support member.

The gearbox assembly of any clause herein, further comprising a fastening device coupled to a forward side of the forward sun gear to secure the split sun gear in an axial direction on the input shaft.

The turbine engine of any clause herein, wherein the first portion and the second portion each comprises a spline connection with the input shaft.

The gearbox assembly of any clause herein, wherein the forward support member is rotationally coupled to the aft support member with a curvic connection.

The gearbox assembly of any clause herein, wherein an axially forward facing surface of the input shaft coupling member comprises a first portion of the curvic connection and an axially aft facing surface of the aft support member comprises a second portion of the curvic connection, the first portion of the curvic connection and the second portion of the curvic connection mating to form a rotational coupling between the input shaft coupling member and the aft support member such that rotation of the input shaft causes rotation of the input shaft coupling member and thus causes rotation of the split sun gear.

The gearbox assembly of any clause herein, wherein the aft support member is rotationally coupled to the input shaft coupling member with a curvic coupling.

The gearbox assembly of any clause herein, wherein the curvic connection comprises a plurality of protrusions and a plurality of slots on the axially forward-facing surface of the input shaft coupling member that mate with a respective plurality of slots and a plurality of protrusions on the axially aft facing surface of the aft support member.

The gearbox assembly of any clause herein, wherein each of the forward support member, the aft support member, and the input shaft coupling member comprises a first portion and a second portion.

The gearbox assembly of any clause herein, further comprising a fastening device extending through the first portion of each of the forward support member, the aft support member, and the input shaft coupling member to secure the forward sun gear and the aft sun gear in an axial direction with respect to the input shaft.

The gearbox assembly of any clause herein, wherein the first portion of the forward support member extends in a radial direction and the second portion of the forward support member extends at an angle between the first portion of the forward support member and the forward sun gear, the first portion of the aft support member extends in the radial direction and the second portion of the aft support member extends at an angle between the first portion of the aft support member and the aft sun gear, and the first portion of the input shaft coupling member extends in the radial direction and the second portion of the input shaft coupling member extends in an axial direction parallel to a longitudinal centerline axis of the turbine engine.

The gearbox assembly of any clause herein, wherein the first portion of each of the forward support member, the aft support member, and the input shaft coupling member extends parallel to each other.

The gearbox assembly of any clause herein, wherein a radially inner surface of the second portion of the input shaft coupling member comprises a first portion of a spline connection and a radially outer surface of the input shaft comprises a second portion of the spline connection, the first portion of the spline connection and the second portion of the spline connection mating to form a rotational coupling between the input shaft and the input shaft coupling member such that rotation of the input shaft causes rotation of the input shaft coupling member and thus causes rotation of the split sun gear.

The gearbox assembly of any clause herein, wherein the spline connection comprises a plurality of protrusions and a plurality of slots on the radially inner surface of the second portion of the input shaft coupling member that mate with a respective plurality of slots and a plurality of protrusions on the radially outer surface of the input shaft.

The gearbox assembly of any clause herein, wherein the gearbox assembly comprises a planet carrier for constraining the plurality of planet gears, the planet carrier coupled to the output shaft.

The gearbox assembly of any clause herein, the turbine engine further comprising a low-pressure shaft coupled to the output shaft and the fan via the gearbox assembly, wherein the low-pressure shaft is drivingly coupled to the input shaft such that rotation of the low-pressure shaft rotates the input shaft.

The gearbox assembly of any clause herein, further comprising a fastening device extending through each of the forward support member, the aft support member, and the input shaft coupling member to secure the forward sun gear and the aft sun gear in the axial direction.

The gearbox assembly of any clause herein, wherein the spline connection is a fixed spline.

The gearbox assembly of any clause herein, wherein the spline connection is a working spline.

A turbine engine comprising the gearbox assembly of any clause herein.

A method of operating the gearbox assembly of any clause herein.

A method of operating the turbine engine of any clause herein.

A method of installing a split sun gear comprising installing an aft sun gear on an input shaft, installing an input shaft coupling member on the input shaft, installing a forward sun gear on the input shaft, and fastening the forward sun gear to the aft sun gear.

A method of installing a split sun gear comprising installing an aft sun gear on an input shaft, installing a forward sun gear on the input shaft, and fastening the forward sun gear to the aft sun gear.

The method of the preceding clause, wherein the aft sun gear and the forward sun gear are each integral with an input shaft coupling member.

The method of any clause herein, wherein the aft sun gear is installed longitudinally over the input shaft.

The method of any clause herein, wherein the aft sun gear is aligned with a forward face of the input shaft.

A method of installing a split sun gear comprising installing a forward sun gear on an input shaft and fastening the forward sun gear to an aft sun gear that is integral with the input shaft.

A gas turbine engine includes an epicyclic gear train mechanically coupled to an LP shaft of the gas turbine engine. The epicyclic gear train includes a sun gear, a ring gear, a carrier, and a plurality of planet gears arranged in a planetary configuration. Each of the plurality of planet gears includes a bearing pin with a pin outer surface, an annular planet gear rim with an inner surface, a planet gear bending stress neutral axis radius, and a pin clearance parameter. The inner surface and the pin outer surface define a clearance, wherein the clearance is greater than zero when a radial component force, a pinch component force, a tangential component force, and a centrifugal component force are applied to the planet gear. The planet gear bending stress neutral axis radius is a radius where stresses and strains within the annular planet gear rim are zero when the radial component force, the pinch component force, the tangential component force, and the centrifugal component force are applied to the planet gear. The pin clearance parameter is defined by:

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of $4.91\times10^{-9}$ horsepower-minutes cubed per cubic inch. The pin clearance parameter is greater than or equal to zero rpm and less than or equal to 3,334 rpm.

The gas turbine engine of any clause herein, wherein the sun gear further comprises a plurality of sun gear teeth, the ring gear further comprises a plurality of ring gear teeth, and the gear ratio of the gearbox assembly is a sum of the number of the plurality of ring gear teeth and the number of the plurality of sun gear teeth divided by the number of the plurality of sun gear teeth.

The gas turbine engine of any clause herein, wherein the pin clearance parameter includes values in a range from zero rpm to 3,000 rpm.

The gas turbine engine of any clause herein, wherein the pin clearance parameter includes values in a range from 48 rpm to 1,334 rpm.

The gas turbine engine of any clause herein, wherein the pin clearance parameter includes values in a range from 80 rpm to 1,300 rpm.

The gas turbine engine of any clause herein, wherein the gas turbine engine is configured to produce the fan power in a range from 7,000 horsepower to 80,000 horsepower at takeoff conditions.

The gas turbine engine of any clause herein, wherein the gas turbine engine is configured to produce the fan speed in a range from 1,600 rpm to 3,334 rpm at takeoff conditions.

The gas turbine engine of any clause herein, wherein the number of the plurality of planet gears is three, four, five, or six.

The gas turbine engine of any clause herein, wherein the gas turbine engine has a bypass ratio in a range from 12 to 15.

The gas turbine engine of any clause herein, wherein the gas turbine engine further comprises a HP compressor disposed aft of the epicyclic gear train, wherein the HP compressor comprises eight, nine, or ten HP compressor stages.

The gas turbine engine of any clause herein, wherein the gas turbine engine further comprises a LP turbine coupled to the LP shaft and comprising a plurality of LP turbine stages, wherein the number of the plurality of LP turbine stages is three, four, five, or six.

The gas turbine engine of any clause herein, wherein the gas turbine engine further comprises: a fan shaft coupled to the carrier of the epicyclic gear train; and a fan coupled to the fan shaft, wherein the fan comprises a fan diameter that ranges from 80 inches to 95 inches.

The gas turbine engine of any clause herein, wherein the fan diameter ranges from 85 inches to 90 inches.

The gas turbine engine of any clause herein, wherein each of the plurality of planet gears further comprises a bearing, and wherein the annular planet gear rim is disposed circumferentially around the bearing.

The gas turbine engine of any clause herein, wherein the bearing comprises a journal bearing.

A gas turbine engine includes a core engine coupled to an input shaft, a fan coupled to an output shaft, and a gearbox assembly, wherein a torque is transferrable from the input shaft to the output shaft through the gearbox assembly. The gearbox assembly includes a split sun gear rotationally coupled to the input shaft, a plurality of planet gears located radially outward of, and intermeshing with, the split sun gear, and a single piece ring gear located radially outward of, and intermeshing with, the plurality of planet gears. The split sun gear includes a forward sun gear and an aft sun gear separate from the forward sun gear, wherein the forward sun gear and the aft sun gear are each rotationally coupled to the input shaft. Each of the plurality of planet gears includes a bearing pin with a pin outer surface, an annular planet gear rim with an inner surface, wherein the inner surface and the pin outer surface define a clearance, and wherein the clearance is greater than zero when a radial component force, a pinch component force, a tangential component force, and a centrifugal component force are applied to the planet gear, a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear, and a pin clearance parameter defined by:

$$PCP = \frac{K_1}{c_r}\frac{GR}{GR-2}r_p^2\left[K_2 r_p^3 \Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the gearbox assembly, "$r_p$" is the planet gear bending stress neutral axis radius in inches, "$N_p$" is a number of the plurality of the plurality of planet gears, "HP fan" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of $4.91\times10^{-9}$ horsepower-minutes cubed per cubic inch. The pin clearance parameter is greater than or equal to zero rpm and less than or equal to 3,334 rpm.

The gas turbine engine of any clause herein, wherein the sun gear further includes a double helical sun gear with a plurality of sun gear teeth, the ring gear further includes a double helical ring gear with a plurality of ring gear teeth, and the gear ratio of the epicyclic gear train is a sum of the number of the plurality of ring gear teeth and the number of the plurality of sun gear teeth divided by the number of the plurality of sun gear teeth.

The gas turbine engine of any clause herein, wherein the plurality of sun gear teeth are arranged into two rows of helical teeth that are of opposing helix angles, and wherein the gear ratio is in a range from 2.5 to 5.

The gas turbine engine of any clause herein, wherein each of the plurality of planet gears is a double helical gear.

The gas turbine engine of any clause herein, wherein the pin clearance parameter includes values in a range from zero rpm to 3,000 rpm, and wherein the forward sun gear and the aft sun gear can be coupled to each other.

The gas turbine engine of any clause herein, wherein the pin clearance parameter includes values in a range from 48 rpm to 1,334 rpm, and wherein the forward sun gear and the aft sun gear can be coupled to each other with a curvic coupling.

The gas turbine engine, wherein the pin clearance parameter includes values in a range from 80 rpm to 1,300 rpm, and wherein the forward sun gear and the aft sun gear can be coupled to each other with a spline coupling.

The gas turbine engine of any clause herein, wherein each of the plurality of planet gears further includes a bearing, and wherein the annular planet gear rim is disposed circumferentially around the bearing.

The gas turbine engine of any clause herein, wherein the bearing comprises a journal bearing.

The gas turbine engine of any clause herein, wherein the clearance is in a range of 0.00075 inches to 0.012 inches.

The gas turbine engine of any clause herein, wherein the fan is a variable pitch fan, and wherein the fan includes a fan diameter in a range from 80 inches to 95 inches.

The gas turbine engine of any clause herein, wherein the fan diameter is in a range from 85 inches to 90 inches.

The gas turbine engine of any clause herein, wherein the gearbox assembly further includes a connection device for rotationally coupling the split sun gear to the input shaft.

The gas turbine engine of any clause herein, wherein the connection device includes a forward support member, an aft support member, and an input shaft coupling member, and wherein the gear ratio can be in a range from 2.5 to 5.

The gas turbine engine of any clause herein, wherein the aft support member is rotationally coupled to the input shaft coupling member with a curvic connection, and wherein the fan can include a fan diameter in a range from 80 to 95 inches.

The gas turbine engine of any clause herein, wherein the input shaft coupling member is rotationally coupled to the input shaft with a spline connection.

The gas turbine engine of any clause herein, further including a fastening device coupled to a forward side of the forward sun gear to secure the split sun gear in an axial direction on the input shaft, and wherein the fan can include a fan diameter in a range from 85 to 90 inches.

The gas turbine engine of any clause herein, wherein a first portion of the input shaft coupling member extends from the forward support member and a second portion of the input shaft coupling member extends from the aft support member, and wherein the gear ratio can be in a range from 2.5 to 5.

The gas turbine engine of any clause herein, wherein the first and second portions of the input shaft each include a spline connection with the input shaft, and wherein the bearing can be a journal bearing, and wherein the gear ratio can be in a range from 3.2 to 4.

The gas turbine engine of any clause herein, wherein the first portion is integral with the forward support member and the second portion is integral with the aft support member, and wherein the bearing can be a journal bearing, and wherein the gear ratio can be in a range from 3.5 to 4.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gas turbine engine comprising:

a core engine coupled to an input shaft;

a fan coupled to an output shaft; and a gearbox assembly, wherein a torque is transferrable from the input shaft to the output shaft through the gearbox assembly, the gearbox assembly comprising:

a split sun gear rotationally coupled to the input shaft, the split sun gear comprising a forward sun gear and an aft sun gear separate from the forward sun gear, wherein the forward sun gear and the aft sun gear are each rotationally coupled to the input shaft;

a plurality of planet gears located radially outward of, and intermeshing with, the split sun gear, wherein each of the plurality of planet gears comprises:

a bearing pin comprising a pin outer surface, an annular planet gear rim comprising an inner surface, wherein the inner surface and the pin outer surface define a clearance, and wherein the clearance is greater than zero when a radial component force, a pinch component force, a tangential component force, and a centrifugal component force are applied to the planet gear;

a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r}\frac{GR}{GR-2}r_p^2\left[K_2 r_p^3\Omega_{fan}^3 - \frac{HP_{fan}}{N_p}\left(\frac{GR-2}{GR}\right)^2\right]$$

wherein "PCP" is the pin clearance parameter in rpm, "$c_r$" is the clearance in inches, "GR" is a gear ratio of the gearbox assembly, "$r_p$" is the planet gear bending stress neutral axis radius in inches, "$N_p$" is a number of the plurality of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96\times10^{-5}$ per horsepower-minute-inch, and $K_2$ is a second constant of $4.91\times10^{-9}$ horsepower-minutes cubed per cubic inch, and wherein the pin clearance parameter is greater than or equal to zero rpm and less than or equal to 3,334 rpm; and a single piece ring gear located radially outward of, and intermeshing with, the plurality of planet gears.

2. The gas turbine engine of claim 1, wherein:

the sun gear further comprises a double helical sun gear with a plurality of sun gear teeth, the ring gear further comprises a double helical ring gear with a plurality of ring gear teeth, and the gear ratio of the gearbox assembly is a sum of the number of the plurality of ring gear teeth and the number of the plurality of sun gear teeth divided by the number of the plurality of sun gear teeth.

3. The gas turbine engine of claim 2, wherein the plurality of sun gear teeth are arranged into two rows of helical teeth that are of opposing helix angles, and wherein the gear ratio is in a range from 2.5 to 5.

4. The gas turbine engine of claim 1, wherein each of the plurality of planet gears is a double helical gear.

5. The gas turbine engine of claim 1, wherein the pin clearance parameter includes values in a range from zero rpm to 3,000 rpm, and wherein the forward sun gear and the aft sun gear are coupled to each other.

6. The gas turbine engine of claim 1, wherein the pin clearance parameter includes values in a range from 48 rpm to 1,334 rpm, and wherein the forward sun gear and the aft sun gear are coupled to each other with a curvic coupling.

7. The gas turbine engine of claim 1, wherein the pin clearance parameter includes values in a range from 80 rpm to 1,300 rpm, and wherein the forward sun gear and the aft sun gear are coupled to each other with a spline coupling.

8. The gas turbine engine of claim 1, wherein each of the plurality of planet gears further comprises a bearing, and wherein the annular planet gear rim is disposed circumferentially around the bearing.

9. The gas turbine engine of claim 8, wherein the bearing comprises a journal bearing.

10. The gas turbine engine of claim 1, wherein the clearance is in a range of 0.00075 inches to 0.012 inches.

11. The gas turbine engine of claim 1, wherein the fan is a variable pitch fan, and wherein the fan comprises a fan diameter in a range from 80 inches to 95 inches.

12. The gas turbine engine of claim 11, wherein the fan diameter is in a range from 85 inches to 90 inches.

13. The gas turbine engine of claim 1, wherein the gearbox assembly further comprises a connection device for rotationally coupling the split sun gear to the input shaft.

14. The gas turbine engine of claim 13, wherein the connection device comprises a forward support member, an aft support member, and an input shaft coupling member, and wherein the gear ratio is in a range from 2.5 to 5.

15. The gas turbine engine of claim 14, wherein the aft support member is rotationally coupled to the input shaft coupling member with a curvic connection, and wherein the fan comprises a fan diameter in a range from 80 to 95 inches.

16. The gas turbine engine of claim 14, wherein the input shaft coupling member is rotationally coupled to the input shaft with a spline connection.

17. The gas turbine engine of claim 14, further comprising a fastening device coupled to a forward side of the forward sun gear to secure the split sun gear in an axial direction on the input shaft and wherein the fan comprises a fan diameter in a range from 85 to 90 inches.

18. The gas turbine engine of claim 14, wherein a first portion of the input shaft coupling member extends from the forward support member and a second portion of the input shaft coupling member extends from the aft support member, and wherein the gear ratio is in a range from 2.5 to 5.

19. The gas turbine engine of claim 18, wherein the first and second portions of the input shaft each comprise a spline connection with the input shaft, and wherein the gear ratio is in a range from 3.2 to 4.

20. The gas turbine engine of claim 18, wherein the first portion is integral with the forward support member and the second portion is integral with the aft support member, and wherein the gear ratio is in a range from 3.5 to 4.

* * * * *